US006716017B2

(12) United States Patent
Papadopoulas

(10) Patent No.: US 6,716,017 B2
(45) Date of Patent: Apr. 6, 2004

(54) EMBOSSING ROLL WITH REMOVABLE PLATES

(75) Inventor: Jeremy James Michael Papadopoulas, Green Bay, WI (US)

(73) Assignee: Paper Converting Machine Company, Green Bay, WI (US)

( * ) Notice: Subject to any disclaimer, the term of this patent is extended or adjusted under 35 U.S.C. 154(b) by 0 days.

(21) Appl. No.: 10/153,335

(22) Filed: May 22, 2002

(65) Prior Publication Data

US 2002/0197346 A1 Dec. 26, 2002

Related U.S. Application Data

(63) Continuation-in-part of application No. 09/802,412, filed on Mar. 9, 2001, now abandoned.

(51) Int. Cl.[7] .......................... B29C 59/04; B31F 1/07

(52) U.S. Cl. ...................... 425/194; 156/582; 425/471; 492/38

(58) Field of Search ................................ 425/194, 363, 425/471; 156/582; 492/38

(56) References Cited

U.S. PATENT DOCUMENTS 1,357,141 A 10/1920 Bibb
1,558,206 A 10/1925 Simpson
1,597,490 A 8/1926 Storey
1,873,041 A 8/1932 Robinson
1,883,185 A 10/1932 Weber
2,060,082 A 11/1936 Johnson et al.
2,958,903 A 11/1960 Decker
3,078,796 A 2/1963 Kamata et al.
3,112,698 A 12/1963 Lake
3,180,007 A 4/1965 Gartz
3,603,256 A 9/1971 Moos et al.
3,760,477 A 9/1973 Koch
3,874,836 A 4/1975 Johnson et al.
4,003,114 A 1/1977 Lewicki et al.
4,005,653 A 2/1977 Arkell
4,056,057 A 11/1977 Smith
4,116,594 A 9/1978 Leanna et al.
4,159,677 A 7/1979 Smith
4,313,378 A 2/1982 Etchell et al.
4,561,355 A 12/1985 Cuir et al.
4,744,297 A 5/1988 Sardella et al.
4,878,407 A 11/1989 Harrison et al.
5,173,313 A 12/1992 Sato et al.
5,281,511 A 1/1994 Gerhardt
5,402,721 A 4/1995 Schultz
5,505,125 A 4/1996 Kapolnck
5,699,740 A 12/1997 Gelbart
5,742,432 A 4/1998 Bianco
5,758,874 A 6/1998 Morrissette
6,043,836 A 3/2000 Kerr et al.
6,109,326 A 8/2000 Leakey et al.
6,173,496 B1 1/2001 Makoui et al.

FOREIGN PATENT DOCUMENTS

EP 1048452 A1 11/2000

OTHER PUBLICATIONS

Catalog pages for Stork RCS Sleeve System (undated).
Catalog pages for Miller Sleeve System (undated).

*Primary Examiner*—James P. Mackey

(57) ABSTRACT

An embossing roll includes a roll body and a plurality of plates which are removably secured to the roll body. Each plate includes an outer surface which is provided with an embossing pattern. The plates can be secured to the roll body by vacuum and/or mechanical devices.

35 Claims, 34 Drawing Sheets

276
259
274
274

274
265
270
271
269
275
277
262
267
258

266
261
266

261

258
262
287
288
285
288
284
286
265

265
260

EMBOSSING ROLL WITH REMOVABLE PLATES

RELATED APPLICATION

This application is a continuation-in-part of application U.S. Ser. No. 09/802,412, filed Mar. 9, 2001 ABN.

BACKGROUND

This invention relates to embossing rolls or engraved rolls for tissue or plastic film or other webs, and, more particularly, to an embossing roll with removable embossing plates.

Paper products such as bathroom tissue and kitchen towels are commonly formed on a rewinder line in which one or more jumbo rolls of webs are unwound, perforated, and rewound into retail sized rolls. Many rewinder lines include an embosser for forming embossments in one or both of the webs and perhaps a glue deck to bond webs together.

The embosser conventionally includes one or more embossing rolls having an embossing pattern and a cooperating backup roll which presses against each embossing roll. The cooperating roll can be, for example, a meshing steel or paper roll or a compliant, smooth rubber-covered roll. A paper roll is formed from compressed paper or cloth. Steel and paper cooperating rolls are formed with recesses which mesh with the projections on the embossing roll. Each web is advanced between an embossing roll and its cooperating roll, and the embossing pattern is embossed into the web.

In most present commercial embossers, the embossing roll is manufactured integrally. That is, a roll body with journals is fabricated, and then the outer surface of this roll is engraved with an embossing pattern, commonly using acid and a resist, and/or indentation by a patterned tool. The problems with an integral embossing roll relate to cost and changeover time:

1. To get a new pattern, it is necessary to create an expensive new roll body.
2. To replace an old pattern, the heavy and expensive roll must be taken out of commission and shipped, for machining to a smaller size, and re-engraving.
3. Damage or wear in a limited surface region requires replacing the entire pattern.
4. When switching embossing rolls to produce a few days, worth of product with a different pattern, the exchange of rolls takes a considerable amount of time, perhaps longer than a working shift.

Covering a smooth precise roll with a removable (slightly undersized) sleeve the surface of which bears an engraved pattern is common in the printing art. It is also known in the embossing art; see, for example, U.S. Pat. No. 6,173,496 and EP 0 836 928 A1. However, this approach has at least several disadvantages:

1. Fabrication of sufficiently well-fitting steel engraved sleeves has been difficult, so printing technology has been used to make the sleeves, e.g., fiberglass sleeves, covered with hard nitrile rubber and laser-engraved. For ordinary production, these sleeves are not considered to be durable enough to be worth the expense.
2. A durable steel sleeve, thick enough for deep engraving, is very difficult to expand temporarily for installation on, and removal from, the supporting roll. In particular, the conventional compressed-air "flotation" method of Miller Graphics U.K., Ltd., Stork Screens America, Inc., Charlotte, N.C. or Strachan and Henshaw Machinery, Inc. is inadequate.
3. Removal of an entire sleeve can be accomplished quickly only if the embosser was designed specifically to support the roll body in a cantilever fashion, i.e., to hold a heavy roll at one end only, with clearance for the sleeve to be withdrawn over the other end. Furthermore, there must be enough space beside the machine to withdraw the entire length of the sleeve.

The advantages of removable plates have been recognized. For example, according to Leanna U.S. Pat. No. 4,116,594, when rolls are used to apply a continuous embossed pattern to a web, removable plates reduce the cost of pattern repair or replacement, and they also reduce the downtime of a changeover. However, all previous embodiments of removable plates:

- have been slow and even difficult to change;
- or were not firmly and uniformly preloaded against the roll;
- or required a special embosser construction;
- or were too large/heavy for a person to carry conveniently;
- or interrupted the engraved surface with noticeable gaps;
- or would not work with the thick plates required for deep engraving commonly practiced in this field.

SUMMARY OF THE INVENTION

The invention provides an embossing roll with embossing plates which are removably secured to a roll body. The removable plates provide the following advantages:

1. When changing embossing patterns, only the surface, i.e., the plates, is changed, not the entire roll body. Therefore, less investment is needed, and storage/shipping costs are reduced. This makes it feasible for converters to stock alternate or backup engraved patterns, and to take on smaller jobs, profitably.
2. The plates can be made of steel so that there is no sacrifice in durability.
3. Small gaps between plates accommodate thermal expansion and manufacturing inaccuracies better than a sleeve.
4. The plates are held to the roll with a fixturing system of vacuum suction and/or mechanical devices. Because the engraved surface is not in sleeve form, it is possible to attach/remove it from a roll without cantilevering that roll or removing it from the embosser (and without requiring substantial side clearance).
5. If the fixturing system includes quick-change features, it will be possible to change embossing patterns in minutes rather than hours.
6. There is no need to invest in a new embosser to utilize the removable plates. The invention will retrofit easily to most existing embossers.

The removable plates may be made of any sufficiently durable material. A key requirement is to provide means to hold them accurately, firmly, and safely against the surface of a fast-turning roll, while they are being pressed against a cooperating roll (which creates heat and "creeping tendencies"). Any holding method should permit reasonably quick changes and advantageously ensure safety in case power or vacuum is lost.

One embodiment uses vacuum to hold the plates, locating pins to guarantee precise location and prevent creeping (unimportant in some applications), and quick-change mechanical interlocks to retain the plates safely when vacuum is turned off. Other embodiments use vacuum alone or omit vacuum and use only mechanical attachments.

Vacuum holding of embossing plates was tested successfully on the rolls of a nested laminator, but it was recognized that customers might not find vacuum attractive for a mill environment (for reasons of contamination, maintenance, and maybe system cost). The preferred embodiments therefore use a purely mechanical plate-locking system.

To achieve the highest radial precision of the mounted-plate surface (essential for consistent glue application in laminated paper towel, and to prevent fretting), substantially the entire back surface of each plate is loaded firmly against the roll surface. But instead of using atmospheric pressure, the preferred embodiments achieve this by pulling tangentially at the edges of the plates, much as laces pull shoes tight on a foot. For low-precision applications such as rubber-to-steel embossing, a simple radial pull-down at multiple points could be effective.

Unlike magnetically held plates which must be flexible for easily peeling them off or on, the plates of the invention can be thick enough to permit deep engraving (even exceeding 0.070 inch depth).

To minimize pattern interruptions in continuous-web embossing, the invention involves inter-plate gaps smaller than 0.030 inch (perhaps even smaller than 0.010 inch), and all plate-fastening is effected from the plate underside. While some prior art stiff-plate die-changing has already involved underside fastening, it is not quick-change (especially on a long roll), and often requires substantial roll-end clearance.

The invention is quick-change: it permits securing or releasing an entire row of plates by means of just one or a few actions performed at the side of the embosser.

The invention does not rely on a single sleeve or even a series of short sleeves, because that would make it necessary to support the roll as a cantilever (i.e., support it by one end) or even remove it, while making a sleeve change. Nor need plates be slid axially to be removed, which requires both end clearance and the prior motion of other plates in the row. Instead, the plates may be removed transversely of the roll, a direction where there are few or no obstructions (rather than axially of the roll, where there is always a substantial obstruction), while the roll remains in place and supported at both ends.

DESCRIPTION OF THE DRAWINGS

The invention will be explained in conjunction with illustrative embodiments shown in the accompanying drawing, in which—

DESCRIPTION OF SPECIFIC EMBODIMENTS

A. General Description of Embossing

Figure 1:
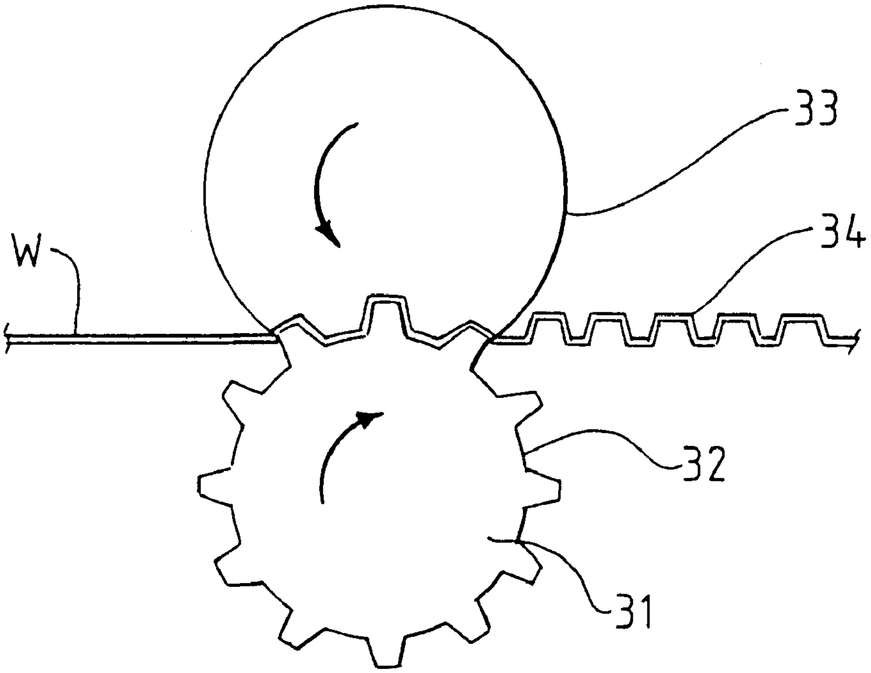
FIG. 1 illustrates conventional rubber-to-steel embossing of a tissue web to add decoration and bulk.

FIG. 1 illustrates conventional rubber-to-steel embossing of a tissue web W to add decoration and bulk. The web can be wound into retail sized rolls of bathroom tissue or kitchen toweling.

An embossing roll 31 includes an engraved surface 32 which is engraved with an embossing pattern. The embossing roll 31 cooperates with a rubber-covered backup roll 33. A web W is advanced between the cooperating rolls, and the embossed surface 32 presses the web into the rubber-covered roll and forms embossments 34 in the web. The roll 33 is adjustable to vary the pressure on the web.

Figure 2:
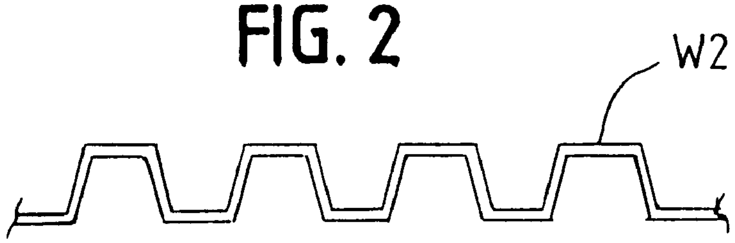
FIG. 2 illustrates a non-laminated two-ply embossed paper product.

FIG. 2 illustrates a two-ply web $W_2$ which has been embossed by the rolls 31 and 33. The embossing of the two webs may create a minimal mechanical bond between the webs. A multiply web having more than two plies can also be embossed.

As is well known in the art, the cooperating backup roll could have an outer surface which is harder than rubber. For example, the surface could be steel or other metal or paper. Hard surfaces are generally formed with cooperating or matching recesses into which the projections of the embossing roll extend.

Figure 3:
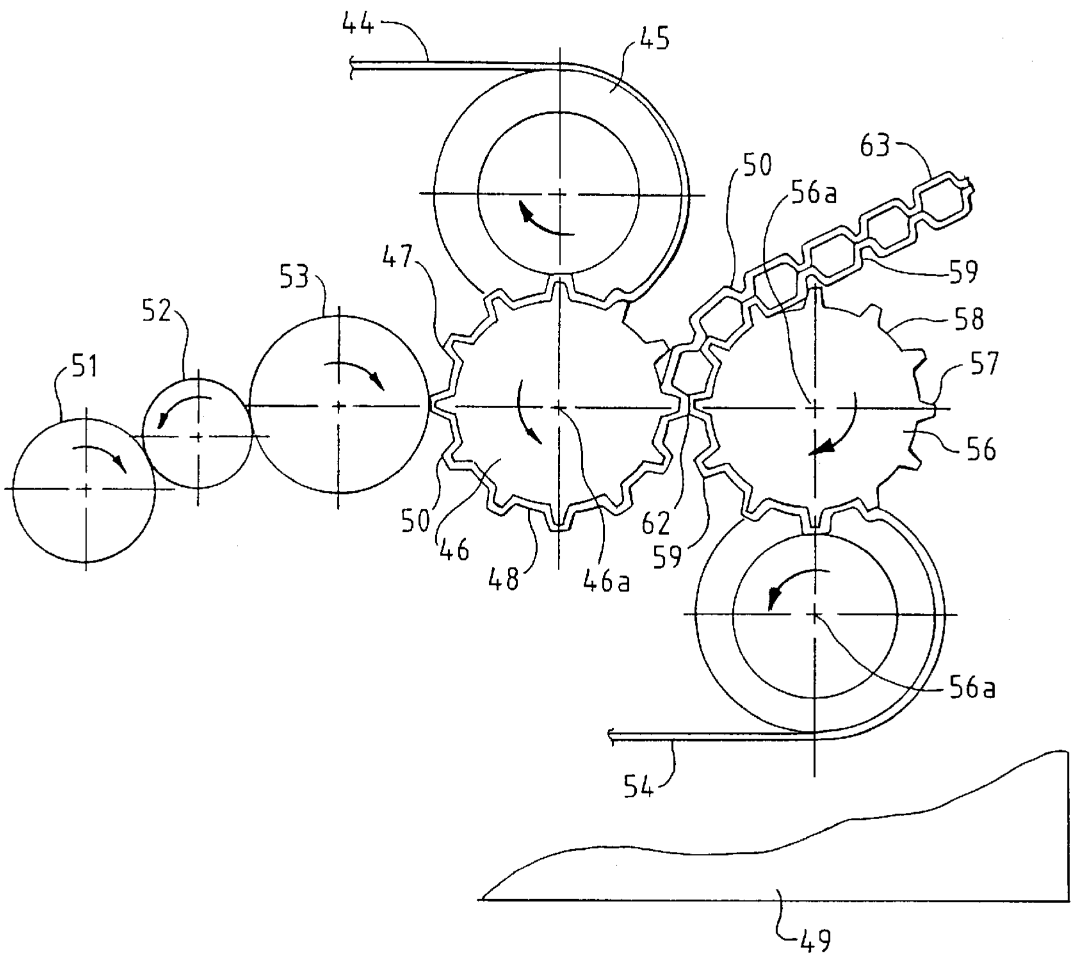
FIG. 3 is a schematic side view of an embossing machine for producing foot-to-foot embossments.

FIG. 3 illustrates a conventional embossing/laminating machine for producing two-ply paper products with foot-to-foot embossments. A top web 44 which is unwound from an unwind stand (not shown) passes between an upper rubber-covered roll 45 and a steel embossing roll 46. The embossing roll is engraved to provide embossments or radially outwardly extending projections 47 and unembossed areas 48 between the projections.

The embossing roll 46 is rotatably mounted in a frame 49 of the embossing machine, and as the embossing roll 46 and the rubber covered roll 45 rotate, projections 47 on the embossing roll 46 press the upper web into the rubber-covered roll 45 and form embossments 50 on the upper web. Adhesive or glue is picked up from an adhesive fountain (not shown) by a transfer roll 51, and the glue is transferred by transfer roll 52 to an applicator roll 53. The applicator roll 53 contacts the embossments 50 of the upper web and transfers glue to the embossments.

A lower web 54 is unwound from another unwind stand and passes between a lower rubber-covered roll 55 and a second steel embossing roll 56. The embossing roll 56 is also provided with embossments or projections 57 and unembossed areas 58. The projections 57 on the second embossing roll press the lower web into the rubber-covered roll 55 and form embossments 59 on the lower web.

The two embossing rolls are geared so that the embossments of the two webs are aligned and are pressed together where the projections of the embossing rollers meet at the nip 62 between the embossing rolls. As the embossments of the webs are pressed together, the adhesive on one of the embossments 50 secures the two plies together. The resulting laminated two-ply embossed product 63 advances away from the embossing machine for further processing operations, for example, in a rewinder line.

The second embossing roll 56 is rotatably mounted in the frame of the embossing machine. The second embossing roll is also advantageously pivotable relative to the first embossing roll 46 so that the nip 62 can be adjusted. The rotational or longitudinal axes 46*a* and 56*a* of the embossing rolls are parallel.

Figure 4:
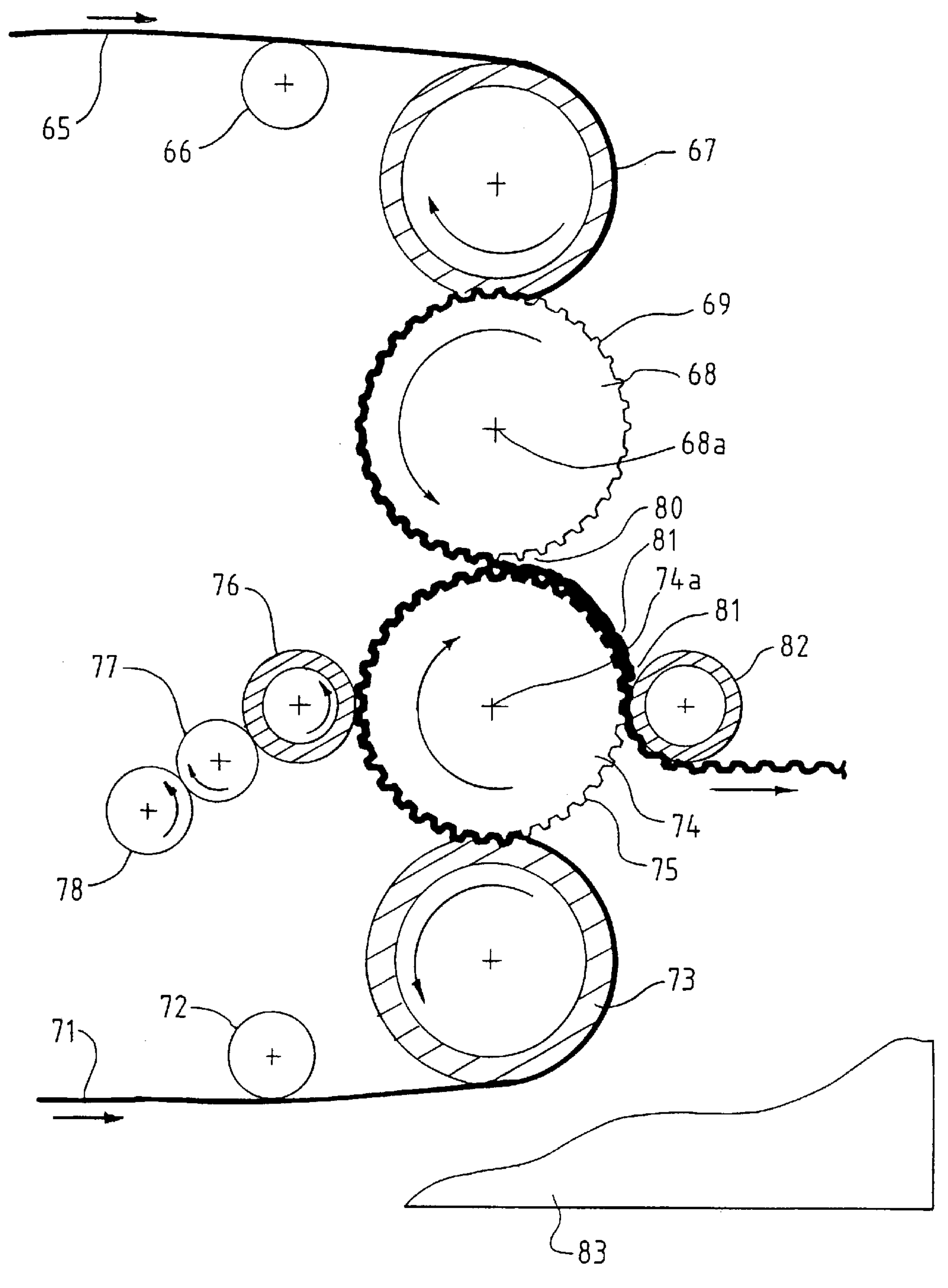
FIG. 4 is a schematic side view of an embossing machine for producing nested embossments.

FIG. 4 illustrates a conventional embossing/laminating machine for producing two-ply paper products with nested embossments. An upper web 65 from an unwind stand advances over a spreader roll 66 and around an upper rubber-covered roll 67. An upper embossing roll 68 having projections or embossments 69 presses the upper web into the rubber-covered roll 67 to form embossments in the upper web.

A lower web 71 is advanced from another unwind stand over a bowed roll 72 and around a lower rubber-covered roll 73. A lower embossing roll 74 having projections or embossments 75 presses the lower web into the rubber-covered roll 73 to form embossments in the lower web.

Adhesive is applied to the embossments of the lower web (while they are still supported by the projections) by an adhesive-applying roll 76 which is supplied with adhesive by transfer rolls 77 and 78 and a fountain (not shown).

The axes of rotation 68*a* and 74*a* of the upper and lower embossing rolls are parallel, and the rolls are separated to provide an open nip 80. The projections 69 on the upper embossing roll are offset from the projections 75 on the lower embossing roll so that the projections of the two embossing rolls mesh at the nip 80. The embossed upper web 65 leaves the upper embossing roll 68 at the nip 80 and meshes with the embossed lower web 71 on the lower embossing roll. The two webs are pressed together at a nip 81 between a rubber-covered marrying roll 82 and the projections of the lower embossing roll 74, and the adhesive on the embossments of the lower web is pressed against unembossed areas of the upper web to secure the two webs together. The rolls are rotatably mounted in a frame 83 of the embossing machine (shown cut away).

B. Embossing Rolls with Vacuum Holding System

Figure 5:
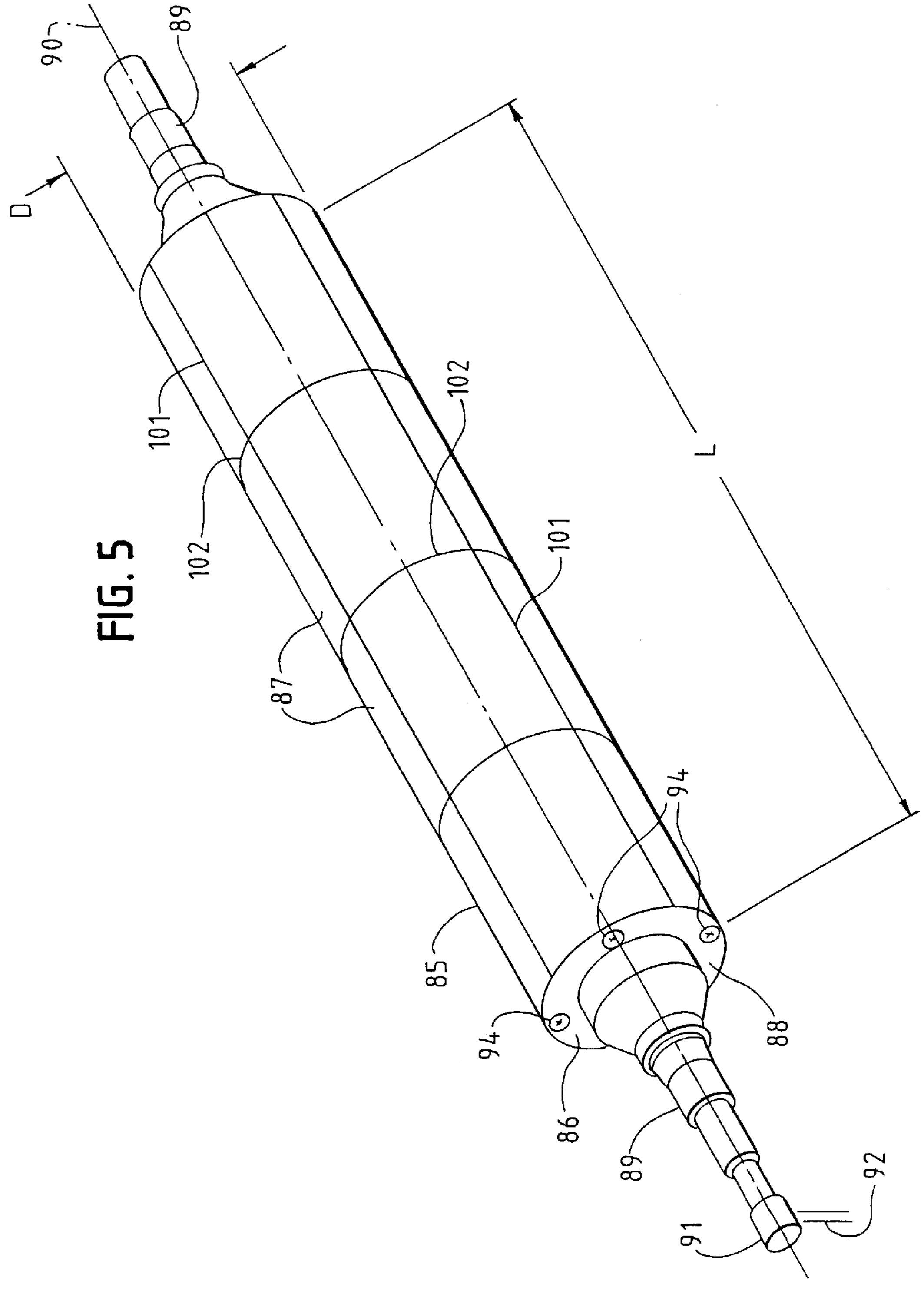
FIG. 5 is a perspective view of one embodiment of an embossing roll which is formed in accordance with the invention.

FIG. 5 illustrates one embodiment of an embossing roll 85 which is formed in accordance with the invention. The embossing roll includes an elongated, generally cylindrical roll body 86 and a plurality of embossing plates 87. The particular roll illustrated includes 16 plates arranged in four longitudinally extending rows or quadrants and four circumferentially extending rows. The outside surfaces of the embossing plates form a cylindrical surface, and an embossing pattern is engraved on the outer surface of the plates.

The embossing roll has a length L and a diameter D. The length of the embossing roll depends on the width of the web which is being embossed. Typical embossing rolls may have lengths of up to 100 or 110 inches or more and diameters of up to 18 to 20 inches or more.

The roll body 86 includes a pair of ends 88 and journals 89 which extend away from the ends along the longitudinal axis of rotation 90 of the embossing roll. A vacuum rotary union 91 is mounted on the end of one of the journals and is connected to a vacuum pump or other vacuum source by vacuum line 92.

Figure 6:
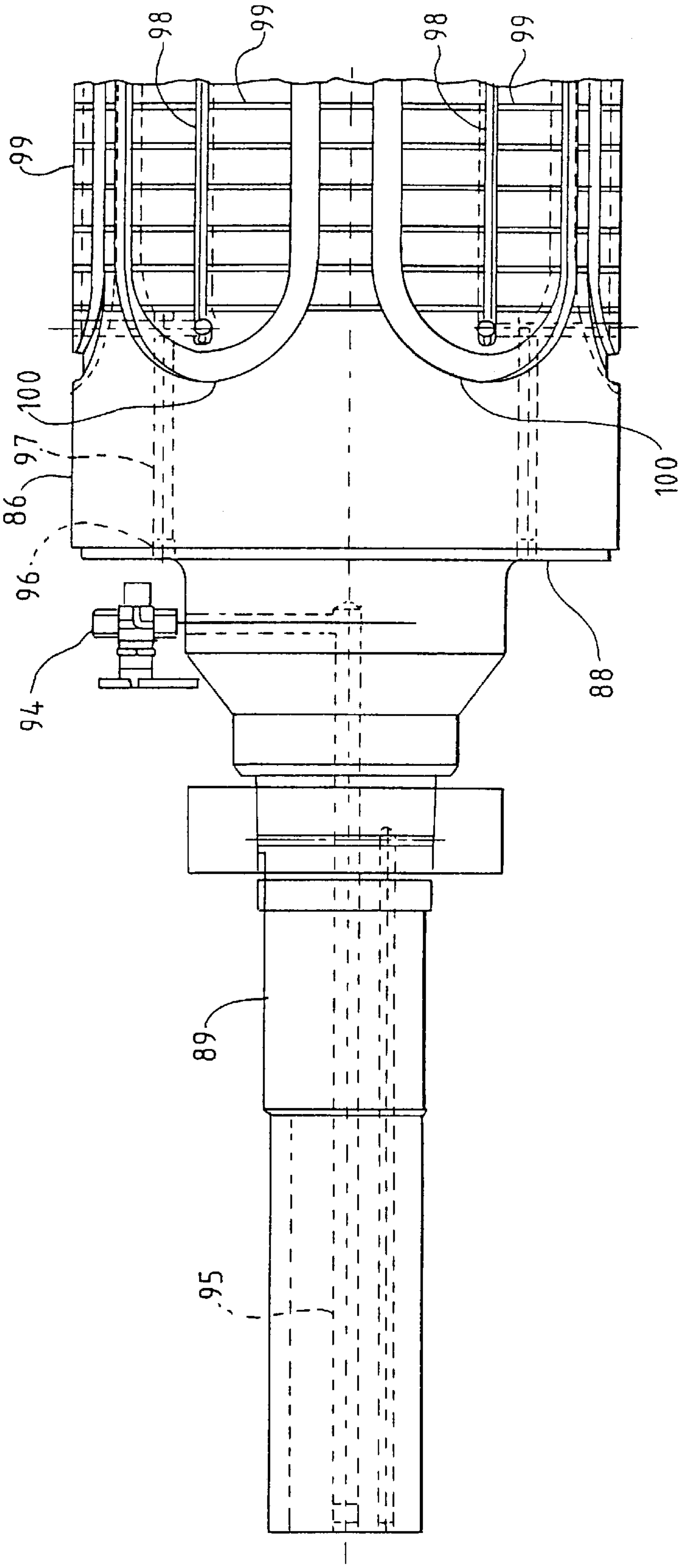
FIG. 6 is a fragmentary view of the body of an embossing roll which is similar to the embossing roll body of FIG. 5.

Referring to FIG. 6, the vacuum rotary union 91 is connected to four vacuum control valves 94 by an internal passage 95 in the journal 89. (Advantageously, in the case of a roll with hollow construction, internal passage 95 will extend to communicate with the roll interior, which can be used as a vacuum reservoir.) Optimally these are 3-way valves, which connect plate-suction areas either to vacuum (for holding) or to atmosphere (to release). Each vacuum control valve is connected through an opening 96 in the roll end 88 and an internal passage 97 in the roll body 86 to deep longitudinal and shallow transverse vacuum grooves 98 and 99 in each quadrant of the outer surface of the roll body. Each quadrant also includes at least one rectangular or oval groove 100 for a sealing gasket to form a vacuum suction area for holding a plate.

Subsequent plates axial of the first plate are conventionally secured with the same vacuum valve. However, each requires its own separate seal area or areas. The seal areas to be controlled by one single valve are conveniently connected by shallow-angle holes as in FIG. 7.

Figure 7:
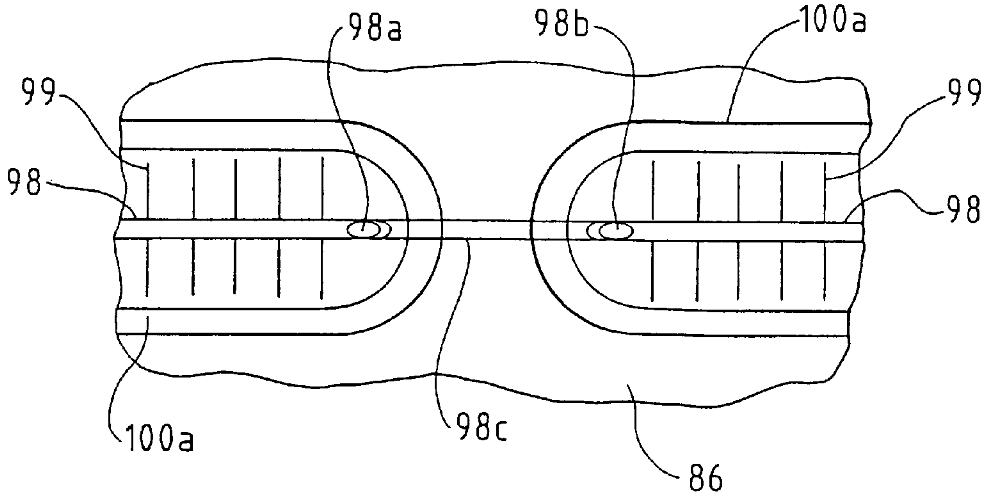
FIG. 7 is a fragmentary plan view of adjacent vacuum areas of the roll body of FIG. 6.

Referring to FIG. 7, two axially adjacent embossing plates are held against adjacent oval sealing glands **100*a* which surround longitudinal vacuum grooves 98 and transverse vacuum grooves 99. Adjacent longitudinal grooves 98 are connected by two shallow-angle drilled holes 98*a* and 98*b* which meet at 98*c* so that the vacuum areas for one longitudinal row of plates may be controlled by one valve. The drilled holes 98*a* and 98*b*** intersect below the surface of the roll body.

In FIG. 5 the embossing plates 87 include straight longitudinal and transverse side edges 101 and 102. However, straight-cut side edges might cause a minor disruption of the protruding elements of an engraved pattern.

Figure 8:
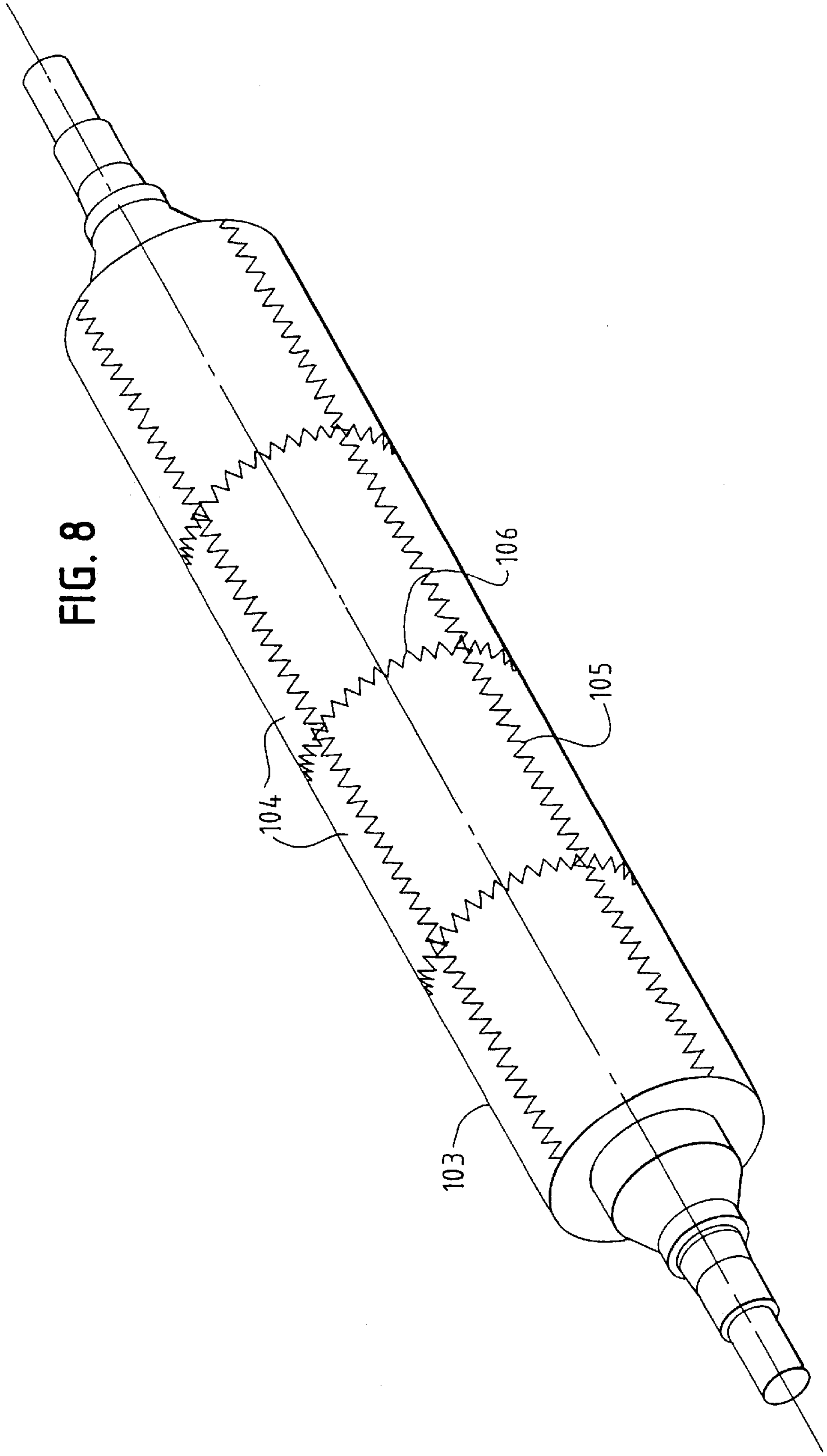
FIG. 8 is a view similar to FIG. 5 of another embossing plate configuration.

FIG. 8 illustrates an embossing roll 103 which is similar to the embossing roll 85. However, the embossing plates 104 of the roll 103 have non-linear side edges 105 and 106 which avoid the important areas of the embossing pattern. While the non-linear side edges might not avoid all of the engraved portions of the plates, the disruption to the embossing pattern is substantially reduced or minimized. The side edges 105 and 106 are shown in zig-zag fashion for illustrative purposes only. The actual preferred contour of the non-linear edges will depend on the embossing pattern.

Figure 9:
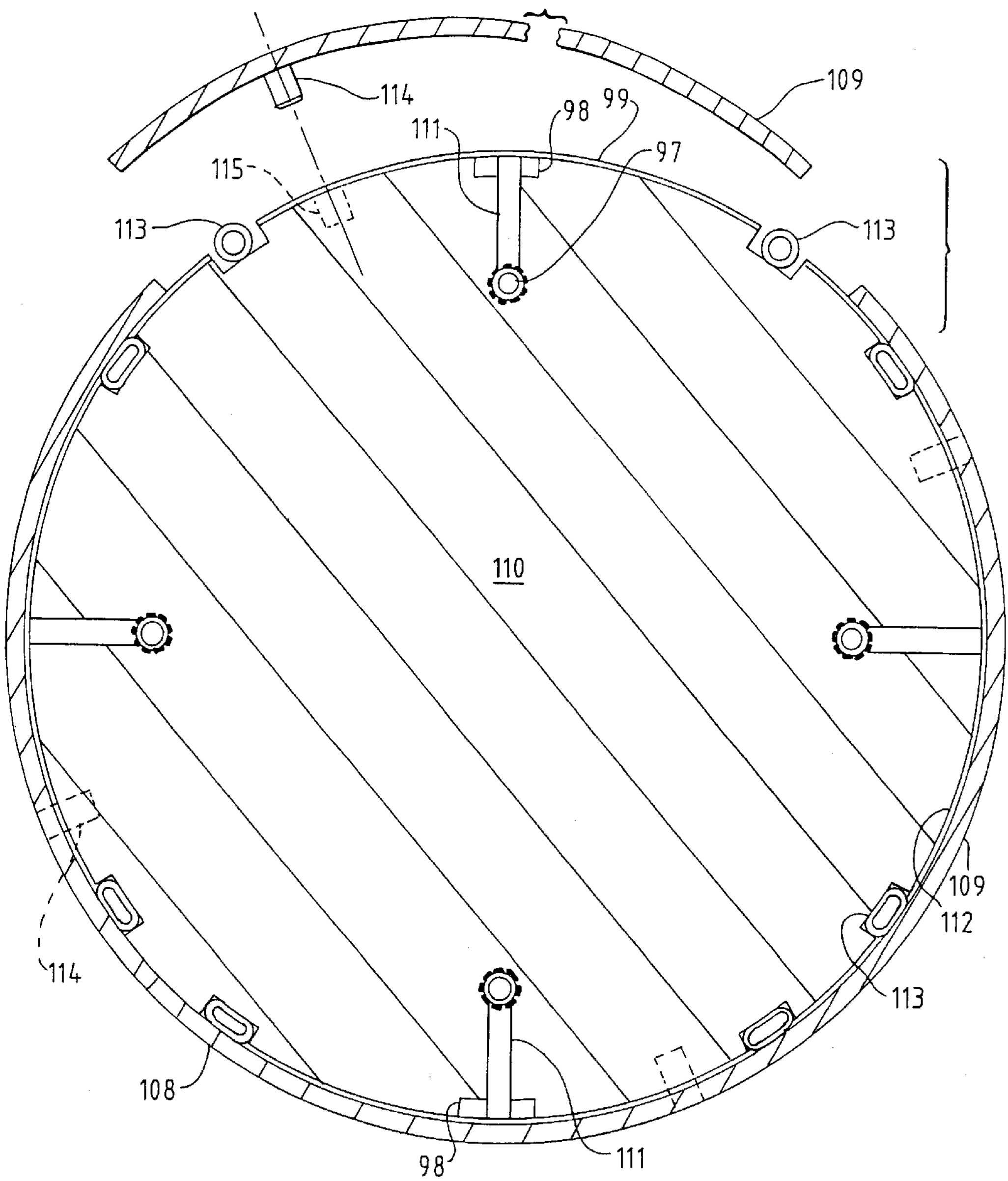
FIG. 9 is an exploded sectional view of one embodiment of an embossing roll.

FIG. 9 is an exploded cross sectional view of an embossing roll 108 in which embossing plates 109 are removably secured to roll body 110 only by vacuum. A vacuum source communicates with the surface of the roll body through internal passages 111, and shallow transverse surface grooves 99 in combination with deeper longitudinal grooves 98 (see FIG. 6) distribute the vacuum force over substantially the entire surface of each plate. Each plate is sucked by vacuum against a flexible and resilient sealing gasket 113.

One or more cylindrical locating studs 114 extend radially inwardly from each plate. Each locating stud is inserted into a circular opening 115 in the roll body. The locating studs prevent the plates from "walking" or "creeping" under the ironing influence of the moving band of pressure which is exerted on the embossing roll by the rubber-covered backup roll.

To guard against the danger of vacuum interruption while the roll is spinning, an electrical or mechanical sensor is used to halt the machinery if vacuum is lessened, and in addition, a check valve placed after the rotary union slows air ingress when the hose is cut.

C. Mechanical Retaining and Loading System

Figure 10:
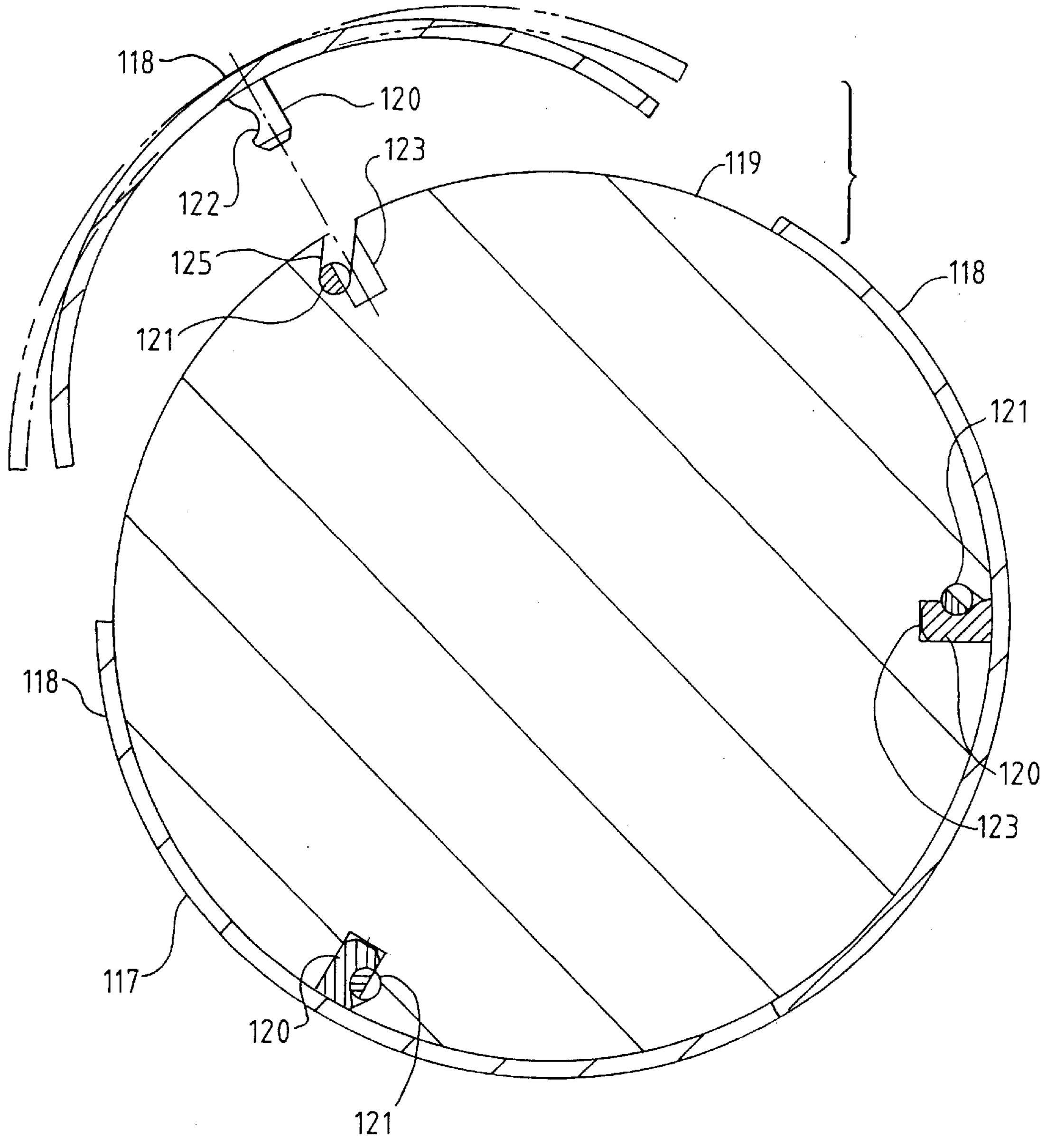
FIG. 10 is an exploded sectional view of another embodiment of a small embossing roll.
Figure 11:
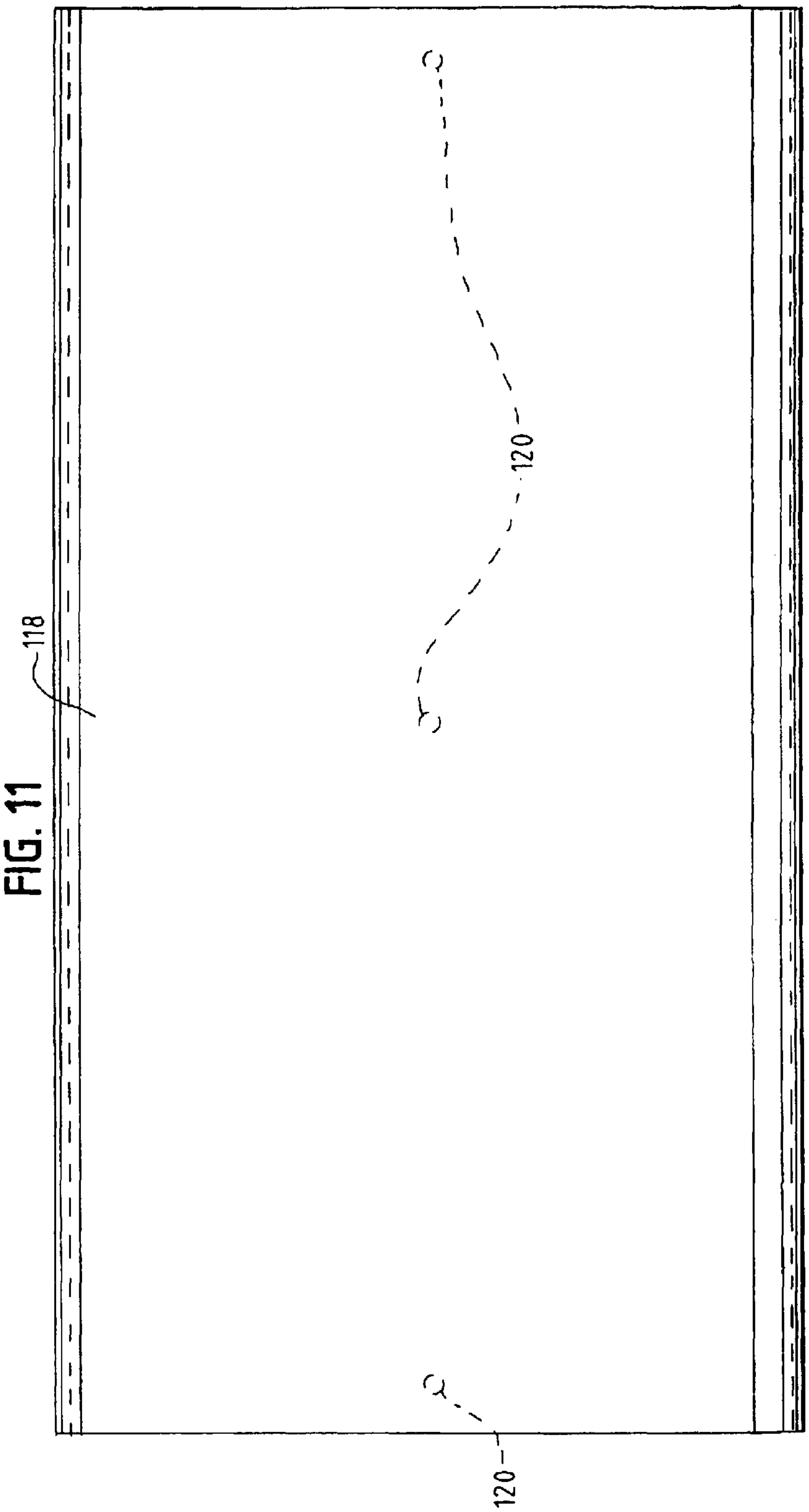
FIG. 11 is a plan view of a curved embossing plate with hidden retaining studs.

FIG. 10 illustrates an embossing roll 117 in which embossing plates 118 are removably secured to roll body 119 by only quick-change mechanical devices. Each plate includes two or more locating and gripping studs 120 (see also FIG. 11) which cooperate with a notched rod 121 (see also FIGS. 12 and 13) which extends longitudinally through the entire roll body. The studs are cylindrical in cross section and include hook-shaped notches 122.

Figure 12:
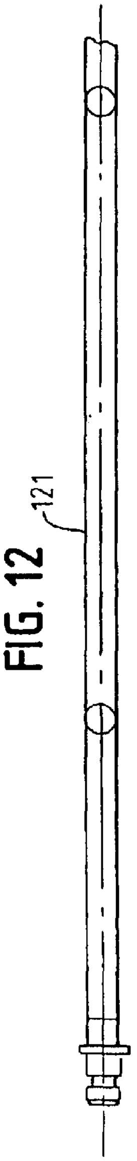
FIG. 12 is a fragmentary view of a rod for removably retaining the embossing plate on an embossing roll.
Figure 13:
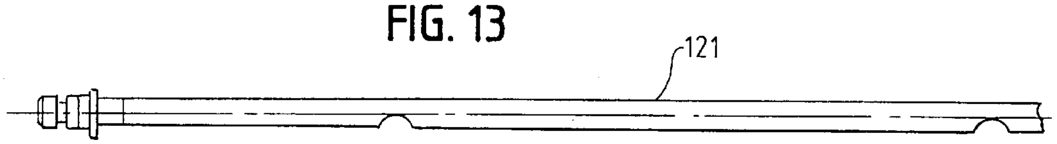
FIG. 13 is a top view of the rod of FIG. 11.

Mechanical Retaining: The studs are inserted into cylindrical openings 123 in the roll body, and the rods 121 extend through portions of the openings. Referring to FIG. 12, each rod is provided with a semicircular notch 124 for each stud. When the notches 124 in the rods are aligned with the opening 123, the studs 120 can be inserted into the openings. The rods are then rotated one-half turn so that solid portions of the rod enter the hook-shaped notches of the studs and draw the studs into openings 123 and draw the plates against the roll body.

Mechanical Loading: Referring to the upper left portion of FIG. 10, each plate advantageously has a radius of curvature which is less than the radius of curvature of the roll body when the plate is not secured to the roll body. The curvature of the unattached plate is shown in solid outline. The plate will therefore flatten out and seat firmly against the roll body, to eliminate rattling and maintain contact despite centrifugal force in high speed operation, when it is drawn against the roll body by the rod 121. The curvature of the attached plate is shown in dotted outline. The bending stiffness of the plate must permit the draw-down to develop a preload higher than the centrifugal force on the plate when the embossing roll rotates.

In the embodiment illustrated, the rods 121 are rotatably supported in longitudinal grooves 125 which are machined in the surface of the roll body. The grooves extend angularly with respect to a radius of the roll body. One end of each rod can include a head or shoulder which bears against a shallow recess at one end of the roll body, and the other end of the rod can be threadedly engaged with a nut which bears against a shallow recess in the other end of the roll body. The rod can be manually rotated to a latching or unlatching position, for example by a key or wrench fitted to an appropriate feature at the threaded end, and, while its orientation is held, the rod can be locked in place by tightening the nut.

Many other attaching devices can be used, for example, sliding rods, screws, dovetails, any of a variety of releasable latch mechanisms, and equivalents thereof. The disclosed studs and rotating rods have the advantages of quick change; no loose parts which might drop to floor, or be forgotten, or work loose to damage the cooperating roll; end actuation; and easy machining into a roll surface, i.e., no long drilled holes. Many other sufficiently strong retaining mechanisms are possible, with or without a draw-down (leading) feature. For example, projecting grippers on the roll body can engage cooperating recesses or cavities in the plates. Any such locking system must have a feature to prevent unexpected loosening due to vibration.

D. Mechanical Retaining and Vacuum Loading

Figure 14:
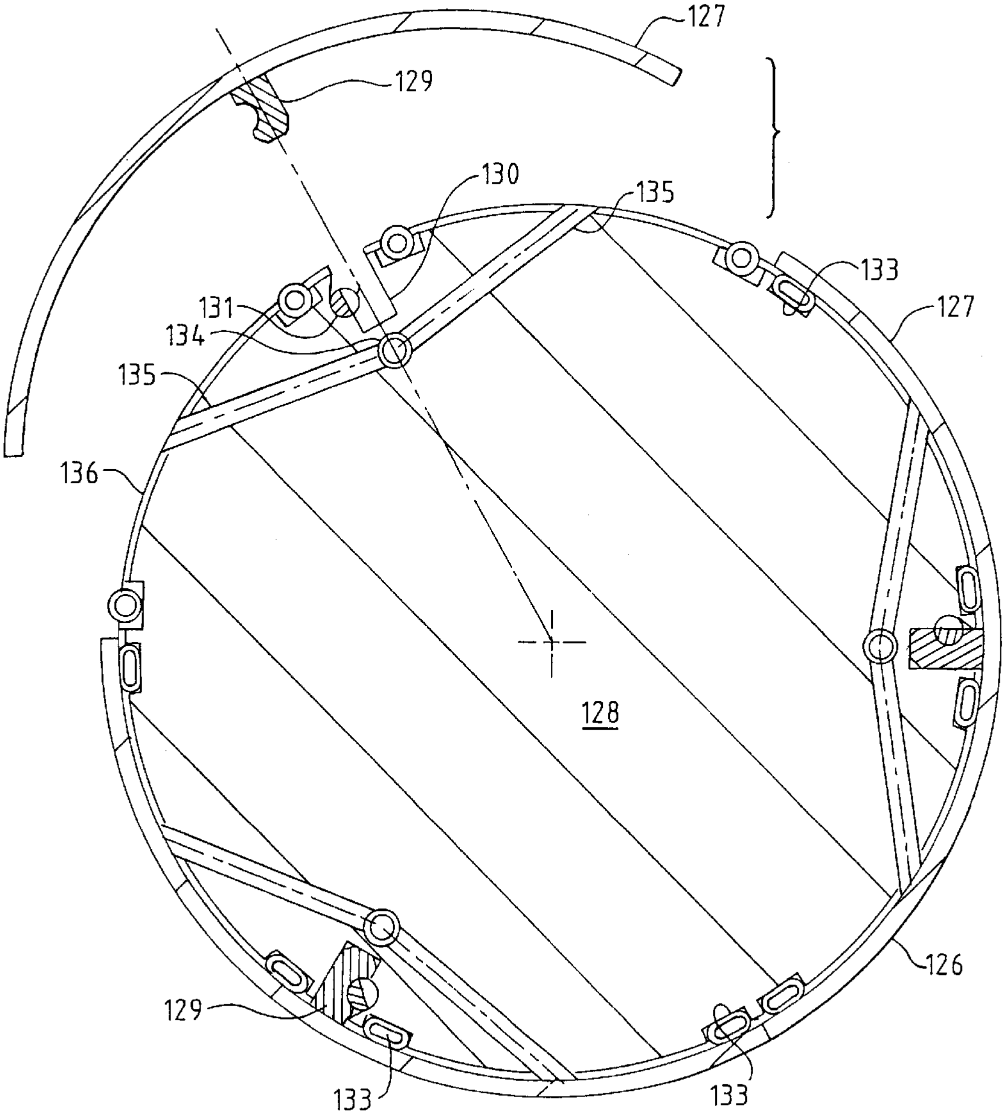
FIG. 14 is an exploded sectional view of another embodiment of a small embossing roll.

FIG. 14 illustrates an embossing roll 126 which uses both vacuum and mechanical devices to attach embossing plates 127 to roll body 128. Each plate includes two or more locating studs 129 as described with respect to FIG. 10. The studs are inserted into openings 130 in the roll body and are captured by rotatable notched rods 131 as described with respect to FIG. 10. The positions of the studs relative to the openings are precise for locating purposes. However, the fit to the cooperating notched rod is loose to assure easy working. As is well known, for slidably engaging pairs, angular clearance is necessary to prevent binding in the eventuality that the plate is slightly tilted.

Mechanical Retaining: The rods 131 are not designed to draw the plate down against the roll body. That is the function of the vacuum system. Rather, the rods serve to retain the plates when the vacuum is turned off or power for the vacuum source is interrupted. For safety, if this should occur while the roll is rotating, the plates must be provided with enough bending strength (by virtue of adequate thickness) to bear the cantilevered centrifugal force.

Vacuum Loading: Two vacuum regions are provided under each of the plates 127. Each vacuum region is defined by a sealing gasket 133. Vacuum communicates with each region through a longitudinal internal passage 134 and branched internal passages 135. The branched passages communicate with grooves 136 in the surface of the roll body.

Figure 15:
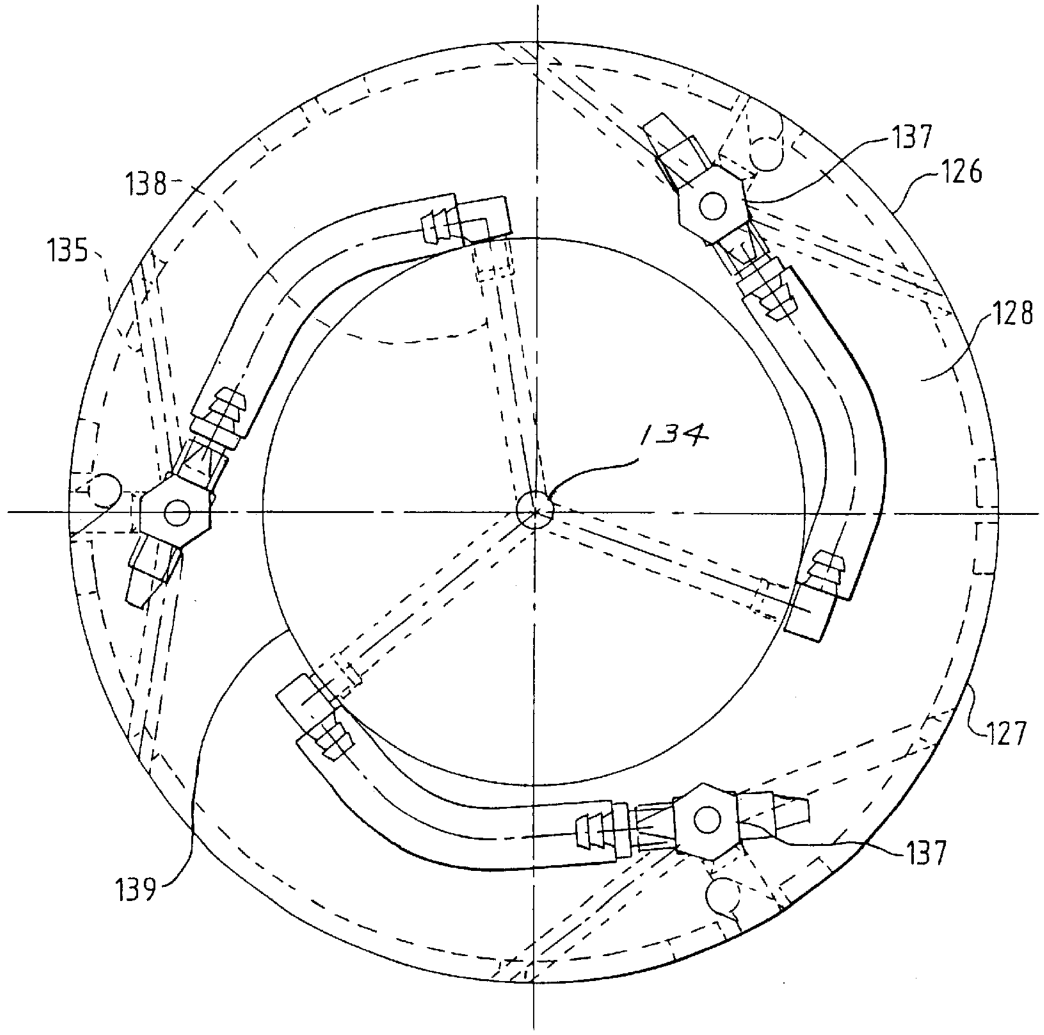
FIG. 15 is an end view of the vacuum control system for the roll body of FIG. 14.

FIG. 15 is an end view of the embossing roll 126 of FIG. 14. Three-way vacuum control valves 137 are connected to the vacuum passages 138 in the journal 139 of the roll and to the longitudinal passages 134.

Figure 16:
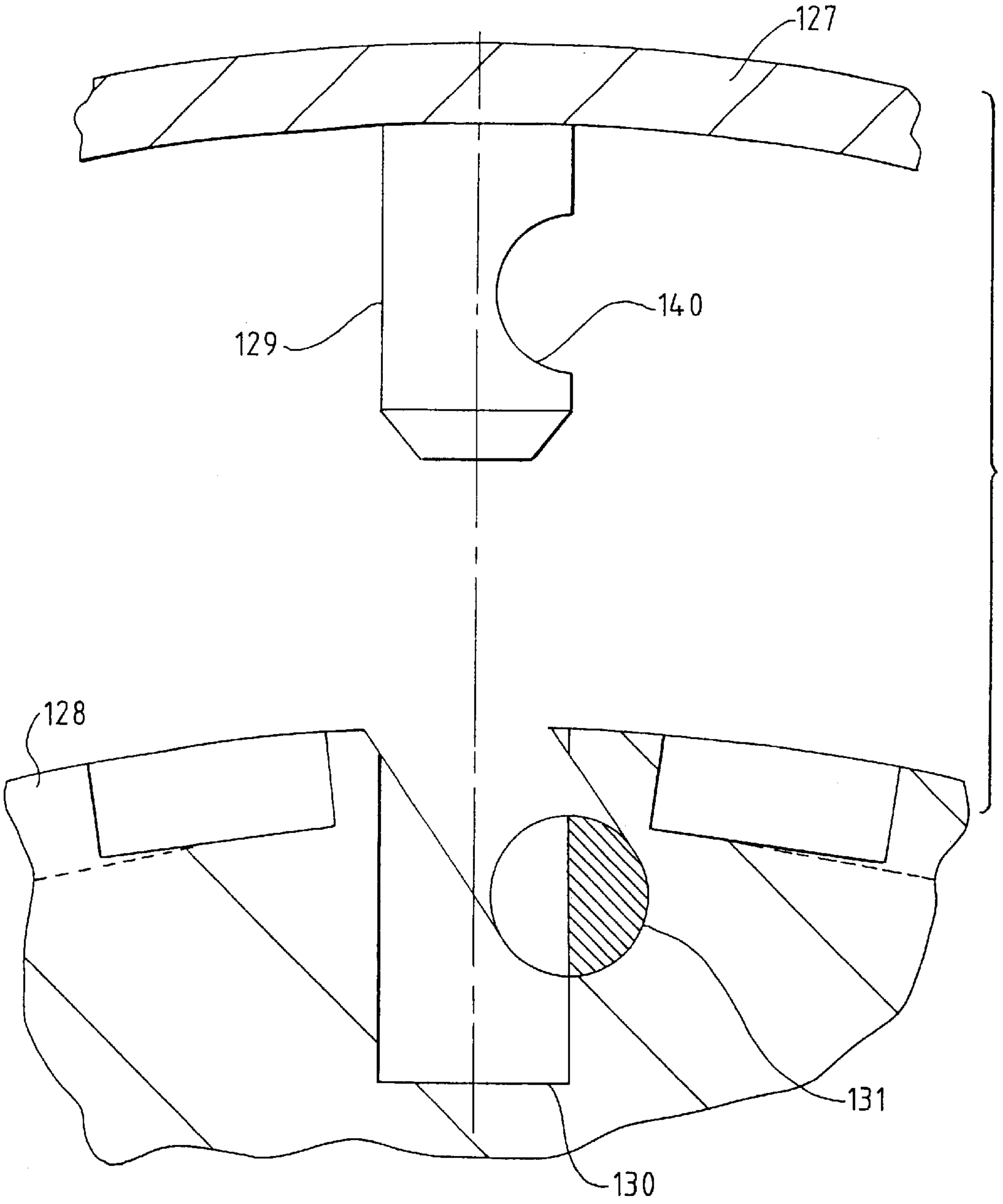
FIG. 16 is an exploded fragmentary sectional view of the roll body of FIG. 14.

FIG. 16 illustrates the notched studs 129 of FIG. 14 which are provided with circular notches 140 which are designed simply to retain the plates rather than load the plates downwardly against the roll body. When the studs are inserted into the openings 130 and the rod 131 is rotated, the solid portions of the rod rotate into the notches 140. It will be understood that variations in the contours schematically indicated at 140 and 131 may advantageously provide draw-down, ejection, and over-center locking functions.

Figure 17:
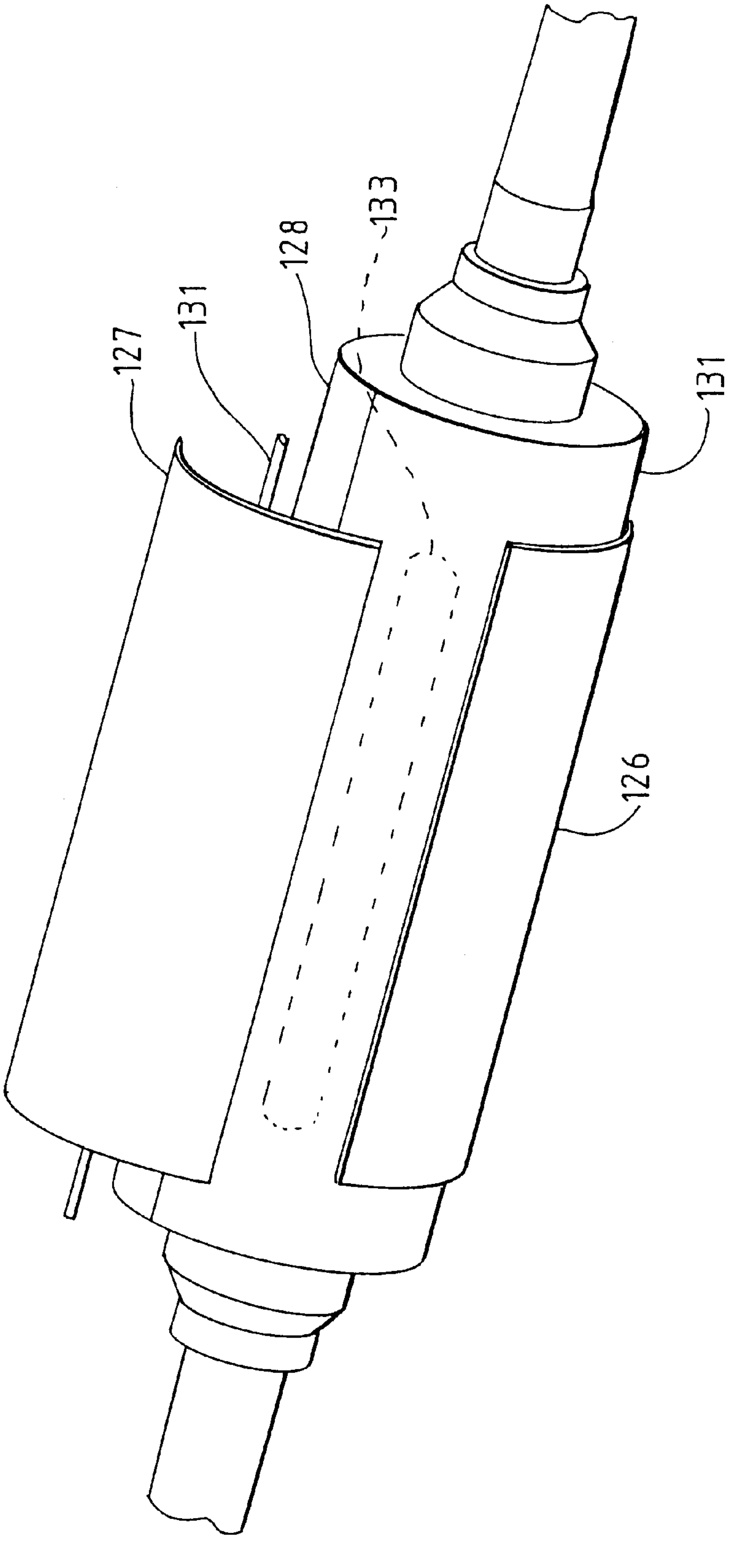
FIG. 17 is an exploded perspective view of the small embossing roll of FIG. 14.
Figure 18:
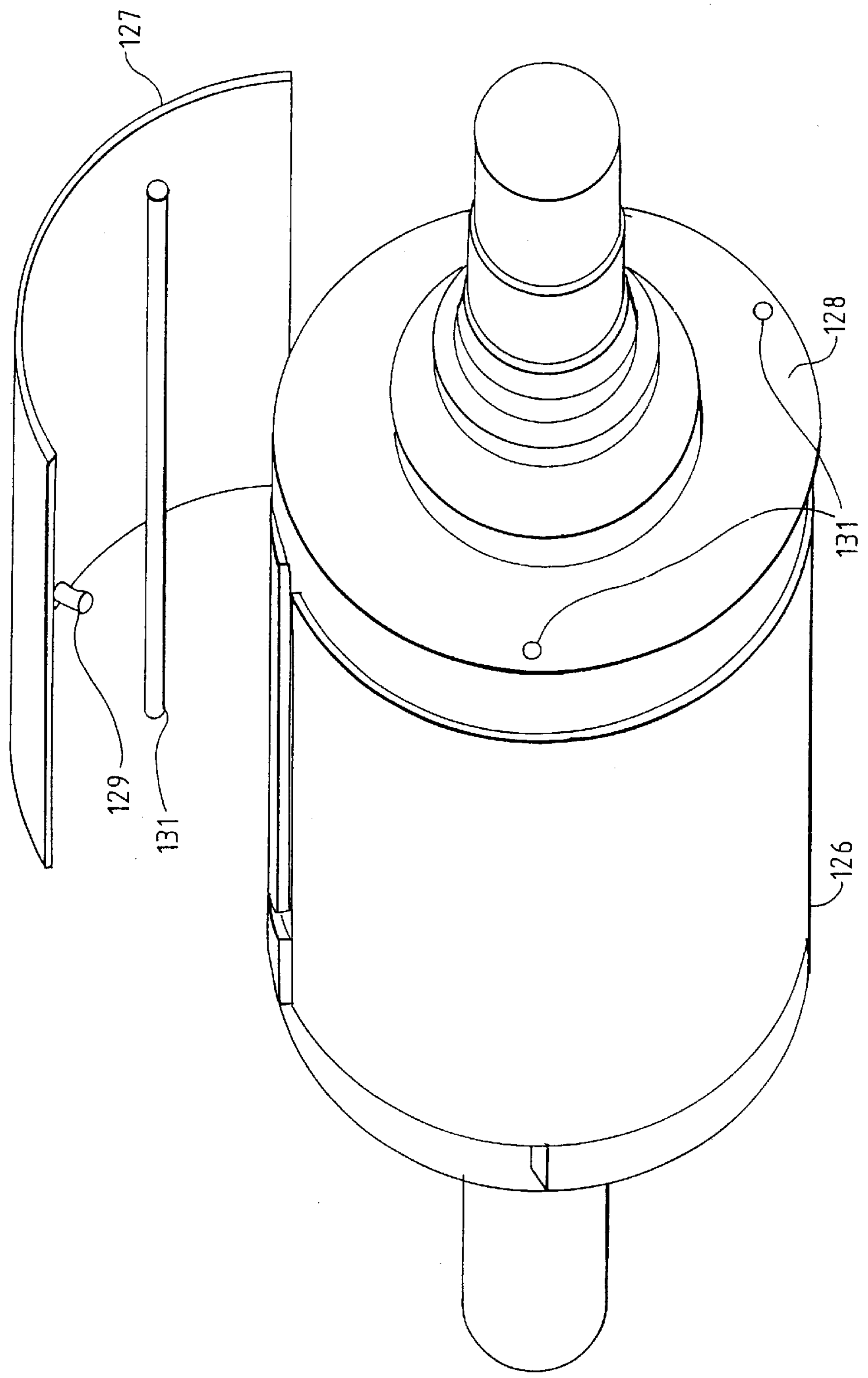
FIG. 18 is another perspective view of the small embossing roll of FIG. 14.

FIGS. 17 and 18 are exploded perspective views of the embossing roll 126. Each of the embossing plates is loaded against the embossing rolls by two vacuum regions which are defined by oval sealing gaskets 133. The ends of the retaining rods 131 extend beyond the ends of the roll body 128 and can be rotated by any convenient mechanism.

The embossing plates fully cover the surfaces of an embossing roll over which the web travels so that the continuous web is embossed with the embossing pattern without interruption. Although adjacent embossing plates are separated at their edges, the side edges of the plates create little if any interruptions or discontinuities in the embossing pattern. When surface heating is expected, a slight gap of approximately 0.010" or more between plates may be intentionally provided to prevent the plates from buckling, and (for the case of locating studs aligned in an axial row), slight clearance in the axial direction of the roll may be provided in the locating holes. Any interruptions in the embossing pattern can be further reduced or minimized by contouring the side edges of the embossing plates to avoid the important areas of the embossing pattern as illustrated in FIG. 7. Preferably the contour would be placed close to protrusion bases, where the rubber roll never penetrates. To eliminate circumferential gaps altogether between axially neighboring plates, the plates can be urged together axially by springs or any other loading means.

The embossing plates can be formed from steel to maximize durability. The thickness of the steel plates can be made sufficient so that the embossing protrusions are not flexed or fatigued by the periodic pressure of the rubber roll.

Figure 19:
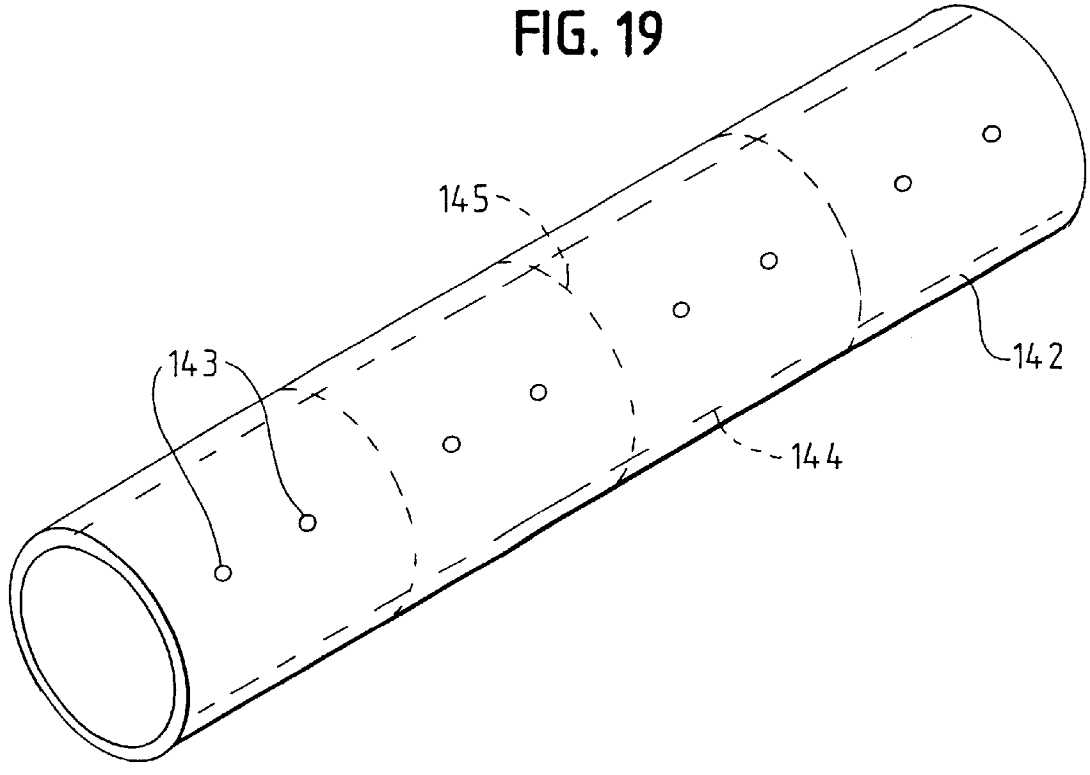
FIG. 19 is a perspective view of a cylindrical steel sleeve which can be used to make embossing plates.

Referring to FIG. 19, the embossing plates for a complete embossing roll can advantageously be formed by first forming an integral steel sleeve 142. For example, a steel sleeve having a wall thickness of 0.25 inch, a diameter of 18 to 20 inches or more, and a length of 100 to 110 inches or more can be formed depending upon the dimensions of the embossing roll.

The sleeve is prepared for later sectioning and precise mounting by drilling holes 114 at precise locations for future studs. If large holes are drilled, the holes can be tapped for installing threaded studs. Small holes can be welded closed on the outside surface of the sleeve, and the inside openings can be used to precisely position studs for welding.

The sleeve is then engraved with the embossing pattern, for example, by match engraving which is a low-force engraving method which will not damage a thin sleeve. Other possible methods are photoengraving of brass or magnesium, spray etching of steel with laser-ablated resist, laser ablation of any plate with surface of polymer or ceramic, or any other low force engraving method which is known in the art.

The engraved sleeve is then cut into a plurality of plates. The thinnest possible kerf, e.g., 0.008–0.020 inch will minimize disruption to pattern. The plates can be cut with straight side edges as indicated by the dashed lines 144 and 145 in FIG. 19, or the edges can be contoured to minimize disruption of the pattern. The plates can be cut either manually, for example, by a jigsaw, or automatically, for example, by laser or water jet.

As an alternative approach, the plates may be cut first and engraved second while held in position on a roll body. In this case higher-force engraving methods may be used. This approach of engraving separate plates also offers the advantages of manufacturing curved plates by rolling flat plates; and eliminating any need for narrow-kerf sectioning.

The embossing plates can be retrofitted to a previously formed conventional embossing roll by removing the previously engraved layer and providing the embossing roll with the vacuum and/or mechanical retaining and loading mechanisms. All of the embodiments described herein involve relatively simple surface features and short holes which can be formed in an existing embossing roll by surface machining and drilling.

The thickness of the embossing plates can vary depending upon various criteria:

1. If the objective is to ensure that the plates will survive loss of vacuum when the embossing roll is spinning rapidly, the centrifugal force acting on the cantilevered plate halves on either side of the attaching studs, e.g., 114, 120, 129, should not cause the plates to yield. For high rotational speeds, i.e., speeds substantially higher than current speeds, this requires a heavy, rigid plate. In fact, the plate would be too heavy to be held by vacuum alone.
2. The thickness which is required for mechanical engraving is about ⅛ inch. If laser engraving or etching can be used, a thinner plate can be used.
3. If the plate will be attached only by mechanical devices along the centerline of the plate and not by vacuum, the thickness should be such that the centrifugal acceleration acting on the half plate freely cantilevered from the mechanical devices would not deflect the edges of the plate by an amount exceeding the drawn-down displacement of the mechanical devices. For high speeds this requires a thick, rigid plate.
4. The overall thickness t of the plate, including the height h of the embossments is preferably greater than 1.5 h:

$$t>1.5\ h$$

In general the thickness of steel plates is preferably within the range of ⅛ to ¼ inch. Thicknesses of about 6 mm or ¼ inch permit machining and provide sufficient plate strength at today's top operating speeds if the mechanical interlock is only in the center of the plate. If it is desired to use a thinner plate or operate at higher speeds, a more complex mechanical interlock system extending closer to the plate edges will be necessary.

1. The plates are heavy enough, and for some embossers require enough arms-outstretched maneuvering, that a supporting or counterbalancing system may be needed. One may use a small jib crane or support arm or temporary guide rails or many other obvious approaches.

2. If so, the plate has to be gripped. And it is not practical to grip it in the normal way (pinching contact on front and back) since the back must be left clear for installation. (In fact, there is no access to the back side when trying to remove from a roll.) One could use an edge grip (e.g., on a small 2 mm lip around the plate, or at least on the two edges formed by the circumferential cuts). That is, draw together two shallow hooks which engage the lip from the front side. In this favored approach the roll should possess ejection means, such as one or more springs trapped under each plate, or an ejection function of the mechanical securing devices. Preferably, the plates to be removed (typically 6 mm thick) would automatically move outwards half their thickness. Exploiting the angular clearance needed to prevent binding, at the juncture between two axially adjacent plates, the plate to be removed can be tilted up (so its edge has moved outwards nearly one full thickness) while the adjacent plate can be tilted down (so as to uncover the lip, etc. of the plate to be removed.)

With such an approach, if plates are removed in sequence from one end, both edges can be exposed to the hooks for edge-gripping.

Alternate front-surface gripping means are vacuum (with highly flexible seals to prevent air leakage between pattern elements) and magnetic.

3. When plates are being installed and removed, they are not locked in place by the preferred mechanical retaining means. To be sure that they do not tumble out in the case that the exchange is performed at a nearly vertical sector of the roll, it is desirable to have some temporary holding feature. One approach is to have a ball detent or other weak but reliable mechanical grip, to hold the studs partway in their respective holes. When it is desired to mechanically clamp the plates, either the vacuum or a mechanical drawdown feature is used to press them against the roll body. In particular, if they are installed in sequence starting at the vacuum distribution end, the normal vacuum system may be designed to provide some weak suction in spite of the air flow from the uncovered vacuum areas.

Alternatively, any of a number of obvious low-force attachment means (including a separate vacuum system) may be used to secure the plates from dropping when the primary holding systems (e.g., vacuum and mechanical) are switched off.

E. Mechanical System for Circumferentially Tensioning Embossing Plates

To achieve the highest radial precision of surfaces of the embossing plates, which is essential for consistent glue application on laminated paper towels, and to prevent fretting, substantially the entire back surface of each engraved plate is loaded firmly against the surface of the embossing roll. Previous embodiments described herein use vacuum to achieve this loading. However, it is often preferable to use a purely passive system that does not attract contamination. The preferred embodiment which will now be described provides mechanical devices which pull tangentially or circumferentially at the plate edges to draw the plates tightly to the embossing roll (much as laces pull shoes tight on a foot).

Figure 23:
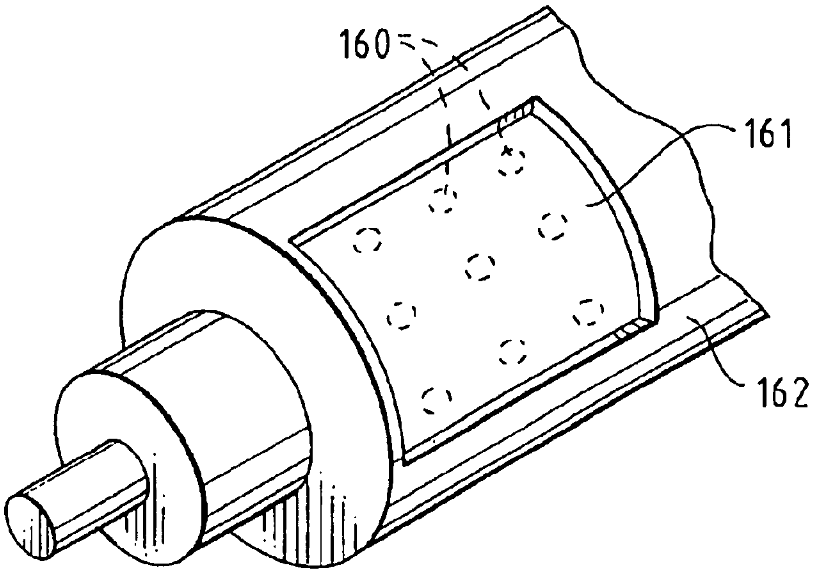
FIG. 23 is a fragmentary perspective view of an embossing roll and an embossing plate which is retained on the embossing roll by multiple pull down points which cannot hold a flexible plate precisely against a spinning roll.
Figure 24:
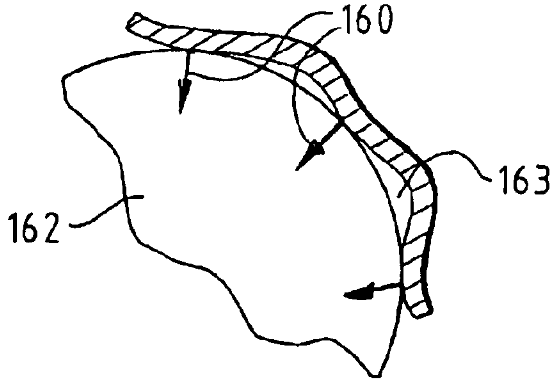
FIG. 24 is a fragmentary sectional view of the embossing roll and embossing plate of FIG. 23 which illustrates, in exaggerated fashion, how multiple pull down points allow gaps to appear between the embossing plate and the embossing roll due to centrifugal forces on the embossing plate.

As illustrated in FIGS. 23 and 24, multiple radially directed retaining devices 160 will not pull (i.e., load) an engraved plate 161 firmly down against the entire surface of the embossing roll 162 but only near the discrete attachment points. Centrifugal force or thermal expansion would inevitably cause a slight movement away from those draw down points which is illustrated in exaggerated fashion in FIG. 24, resulting in gaps 163 between the engraved plate and the embossing roll. It is possible to overcome this by specially contouring the inner surface of the plate or roll, such that initial contact is made away from the attachment points, which generate pressure when drawn down into contact. However, the necessary fabrication precision is costly to achieve.

Figure 20:
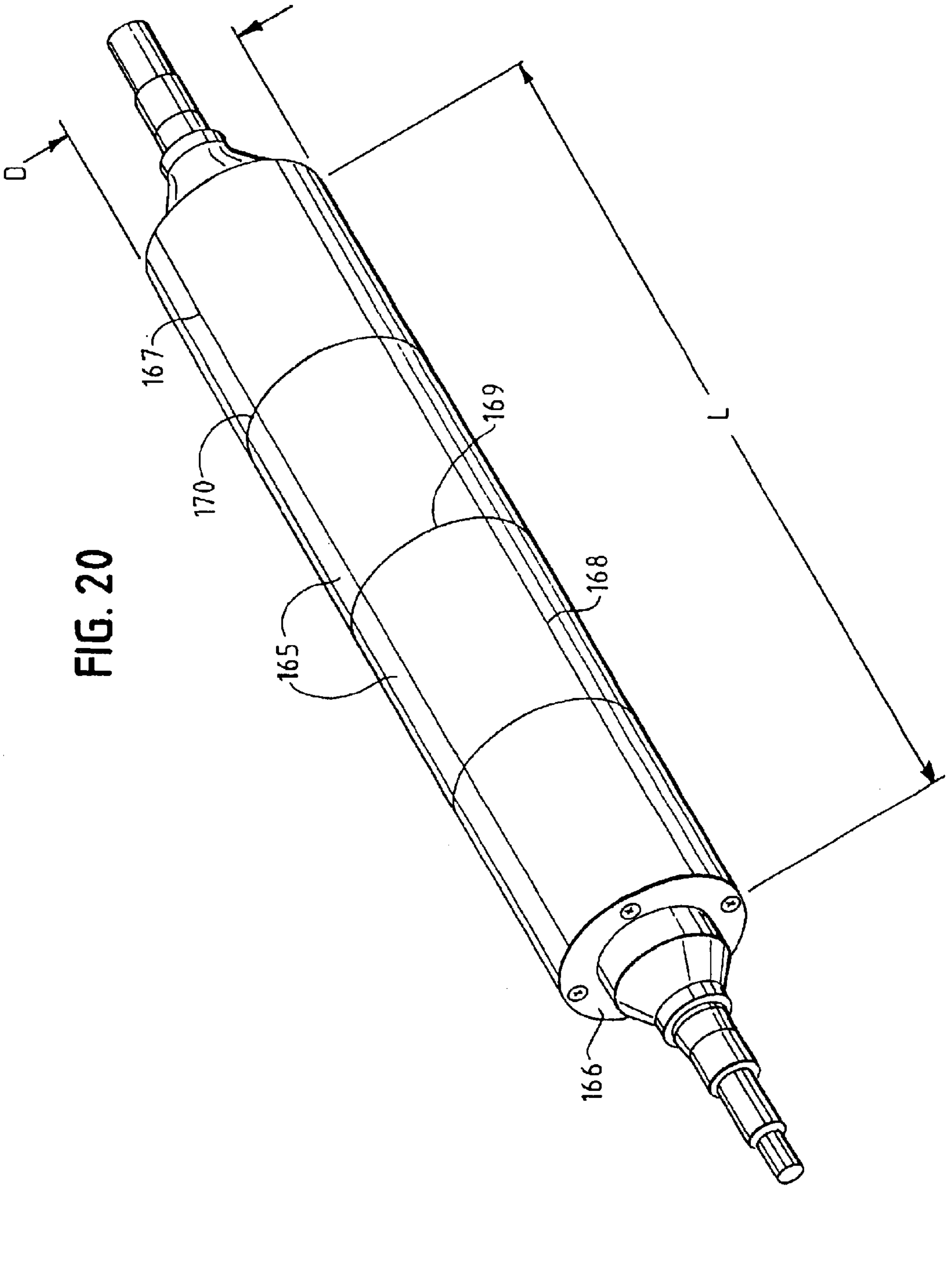
FIG. 20 is a view similar to FIG. 5 of an embossing roll which includes a mechanical system for retaining and holding embossing plates.
Figure 21:
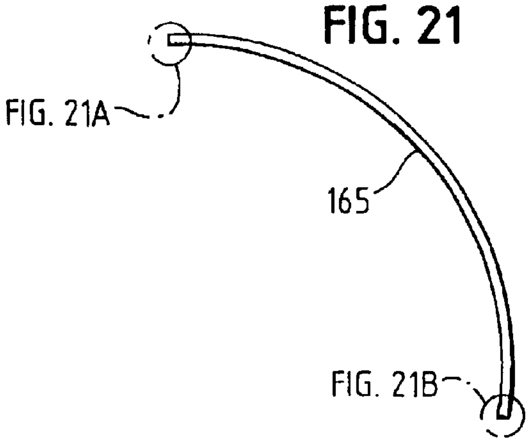
FIG. 21 is an end view of one of the embossing plates of FIG. 20.
Figure 22:
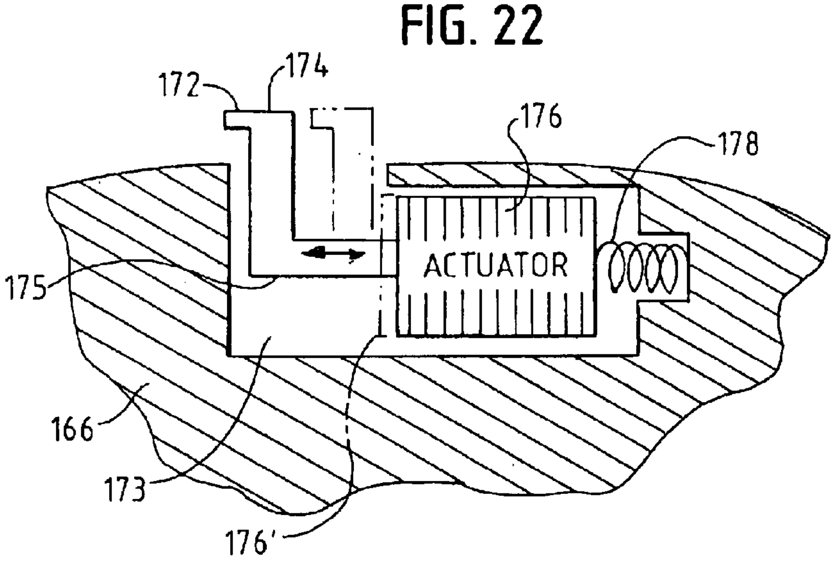
FIG. 22 is a fragmentary sectional view of the embossing roll showing one of the mechanical devices for retaining and loading the embossing plates.

Referring to FIGS. 20–22, a plurality of embossing plates 165 are circumferentially or tangentially tensioned and retained on an embossing roll 166. Each plate includes straight side edges 167 and 168 which extend parallel to the axis of the embossing roll and curved side edges 169 and 170 which extend around the circumference of the roll and in a plane which extends transversely to the axis of the roll.

Figure 21A:
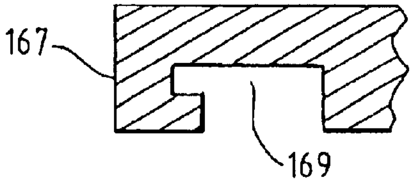
FIG. 21A is an enlarged fragmentary sectional view of one of the side edges of the embossing plate of FIG. 21.
Figure 21B:
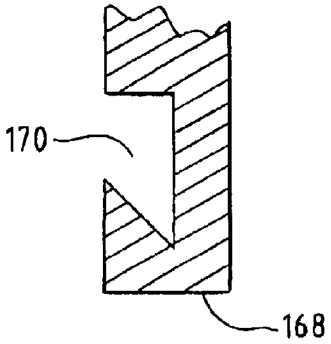
FIG. 21B is an enlarged fragmentary sectional view of the other side edge of the embossing FIG. 21.

In the embodiment illustrated in FIG. 21, each of the side edges 167 and 168 is provided with a cavity or groove of form 169 or 170 for mechanically loading the plate. FIGS. 21A and 21B illustrate two different options for cavities, but many other configurations can also be used.

FIG. 22 illustrates one embodiment of a retaining and loading device 172, shaped to cooperate with cavity 169, which is mounted in a cavity 173 in the embossing roll 166. The retaining device 172 is generally L-shaped and includes an outer end 174 and an inner end 175. The outer end 174 projects radially outwardly beyond the cylindrical surface of the embossing roll, and the inner end 175 is controlled by an actuator 176 which moves the retaining device between a release position illustrated in phantom outline and a loading position illustrated in solid outline. The actuator may be lockable in either or both positions. A compliant spring 178 is advantageously interposed between the actuator and the embossing roll cavity wall for providing proper tension on the embossing plates while the actuator is locked even when the plates shift or grow thermally. The spring allows movement of the actuator 176 as indicated by the phantom outline 176'.

The actuator 176 advantageously controls retaining dogs 172 for an entire axial row of embossing plates. When the retaining dogs 172 are in their release positions illustrated in phantom in FIG. 22, the plates in that row can easily be removed or installed. When the plates are installed, the actuator 176 moves the retaining devices 172 to their retaining positions, then extends further to compress the spring, thereby circumferentially tensioning the plates and loading them firmly against the embossing roll. Underside vacuum on the embossing plates can also be used to load the plates firmly against the roll as previously described if proper seals are provided.

Figure 25:
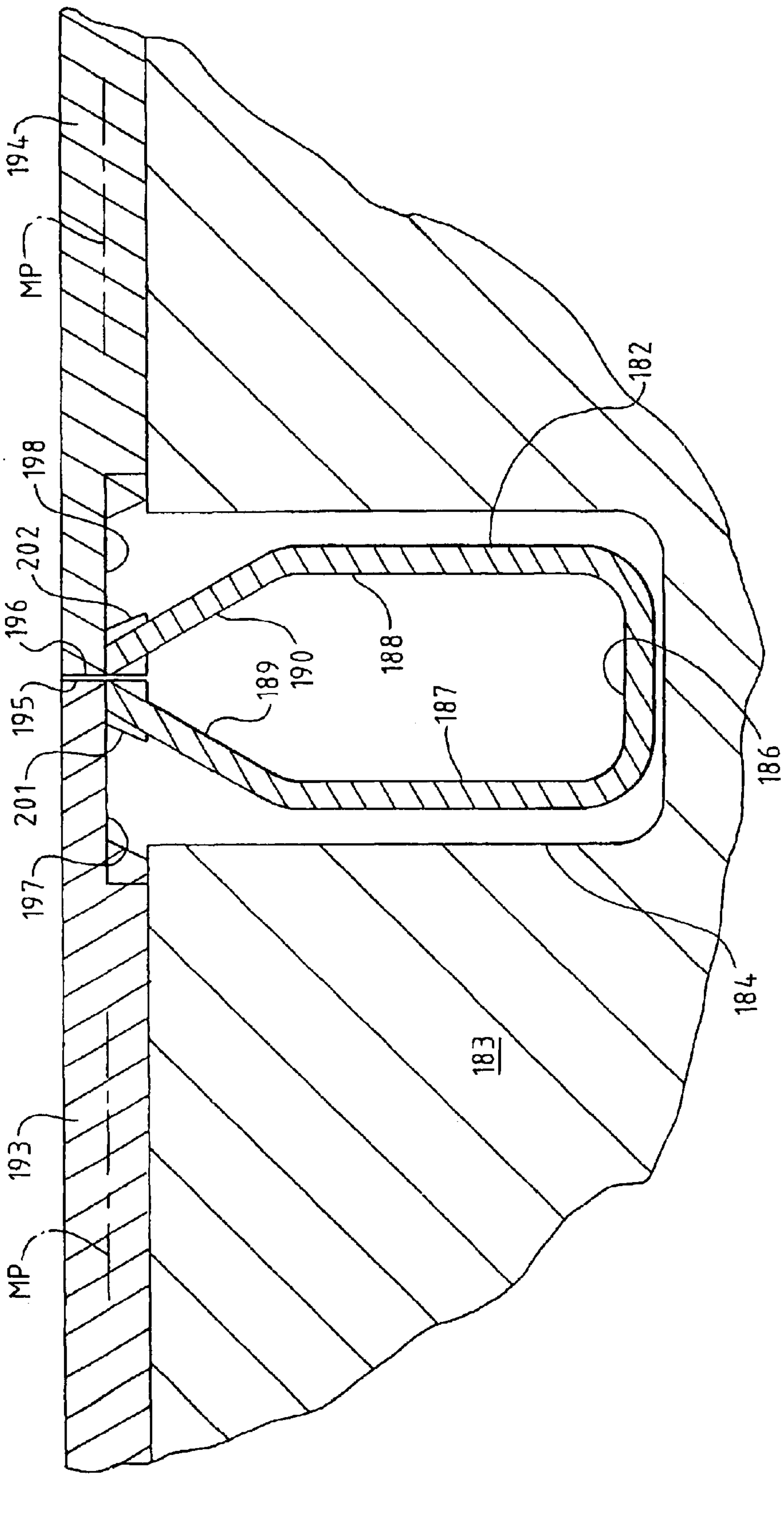
FIG. 25 is a fragmentary sectional view of an embossing roll and embossing plates which illustrates a spring clip for drawing edges of adjacent embossing plates together.
Figure 28:
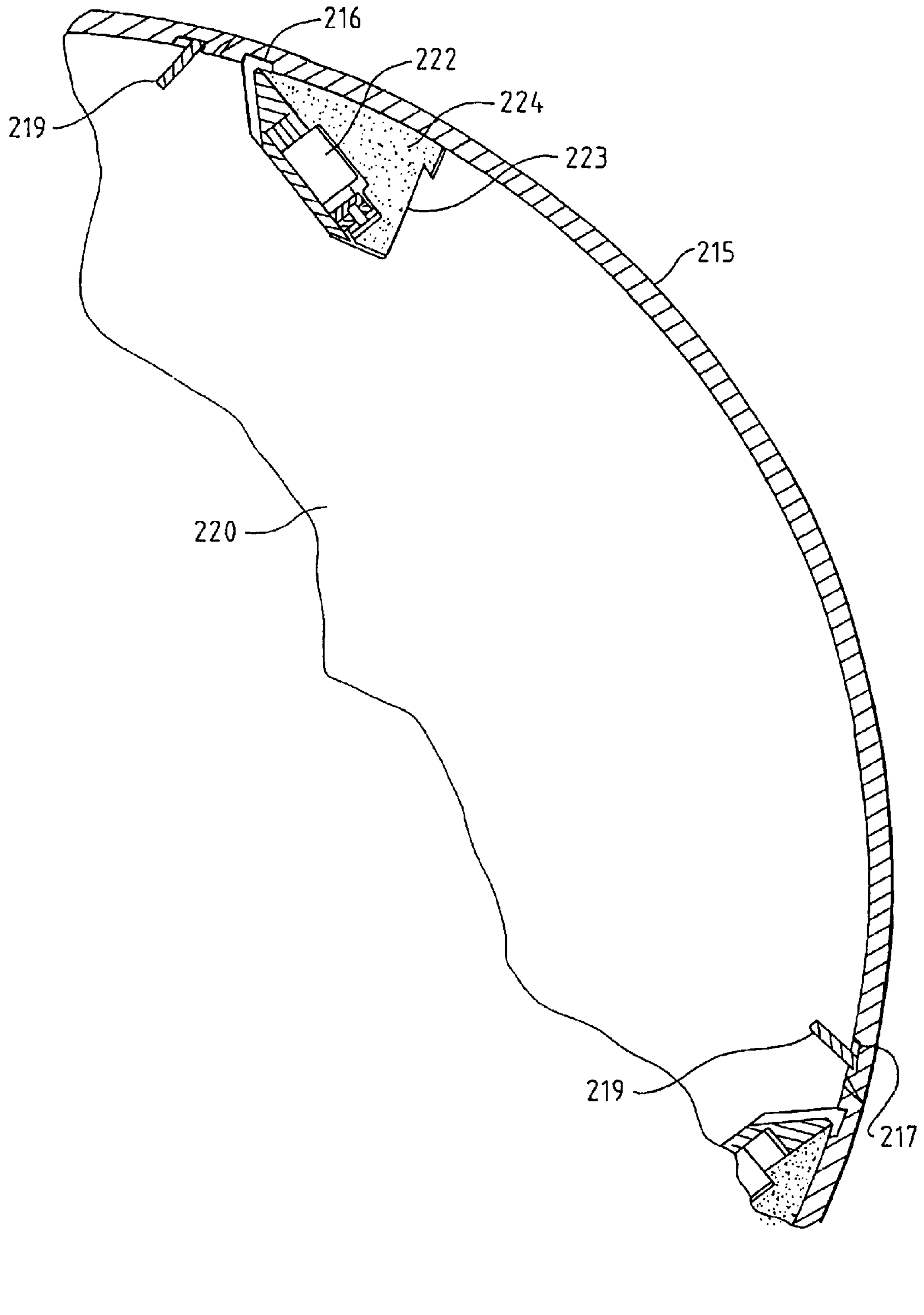
FIG. 28 is a fragmentary sectional view of an embossing roll, an embossing plate, and the preferred mechanical system for retaining the embossing plate on the embossing roll.

The embossing plates can be circumferentially tensioned either by drawing the edges of adjacent plates together as illustrated in FIG. 25 (first approach), or by stretching one plate edge away from the other edge as shown in FIG. 28 (second approach). The first approach, transmitting tension from one plate to the next, lends itself to a very simple construction. However, removing one row of plates requires releasing both neighboring rows, thereby making a change more difficult. The second approach, tensioning axial rows of plates individually, even when neighboring rows are not yet installed, involves a little more hardware.

Figure 26:
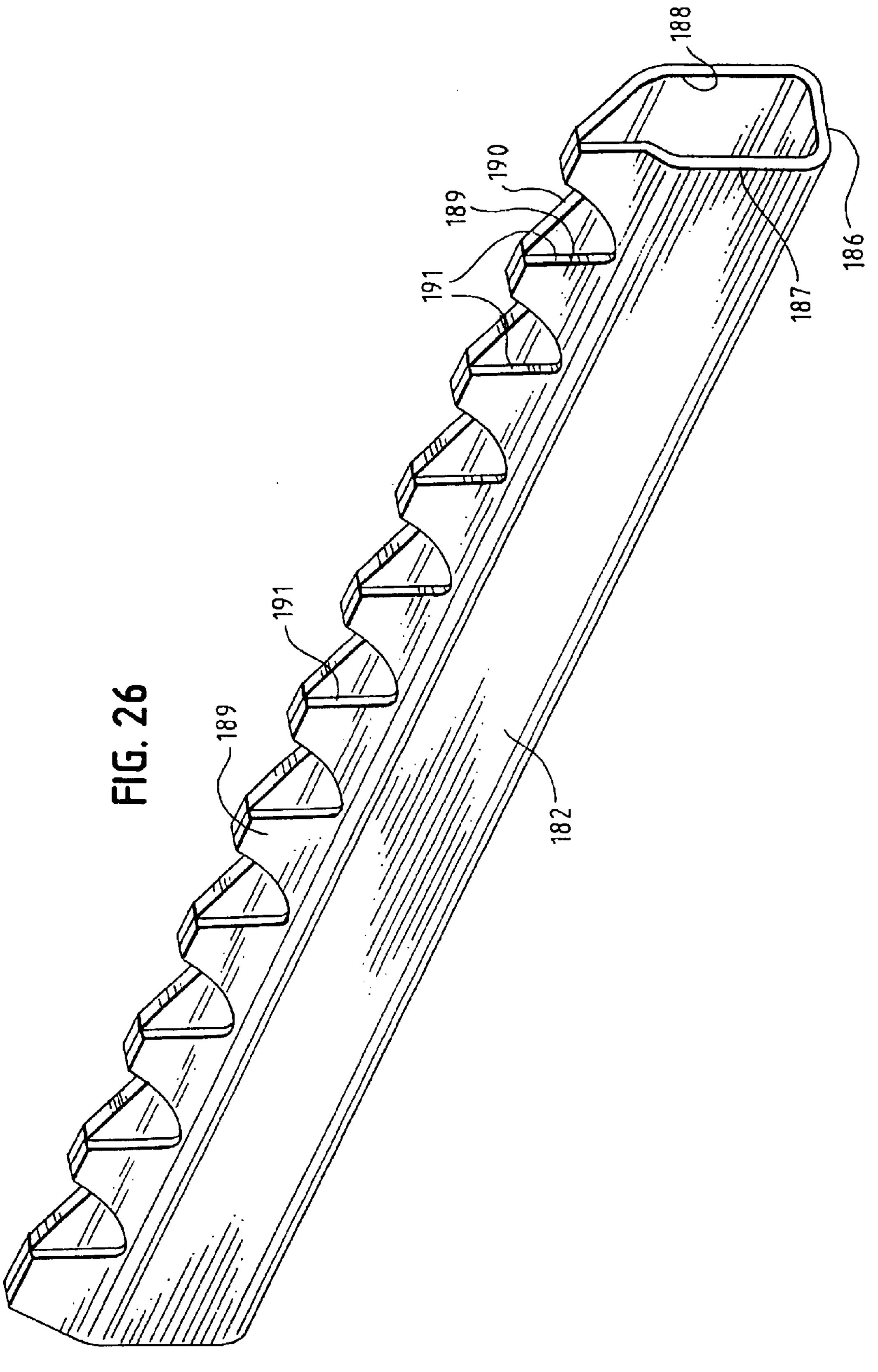
FIG. 26 is a fragmentary perspective view of a short section of the spring clip of FIG. 25.
Figure 27:
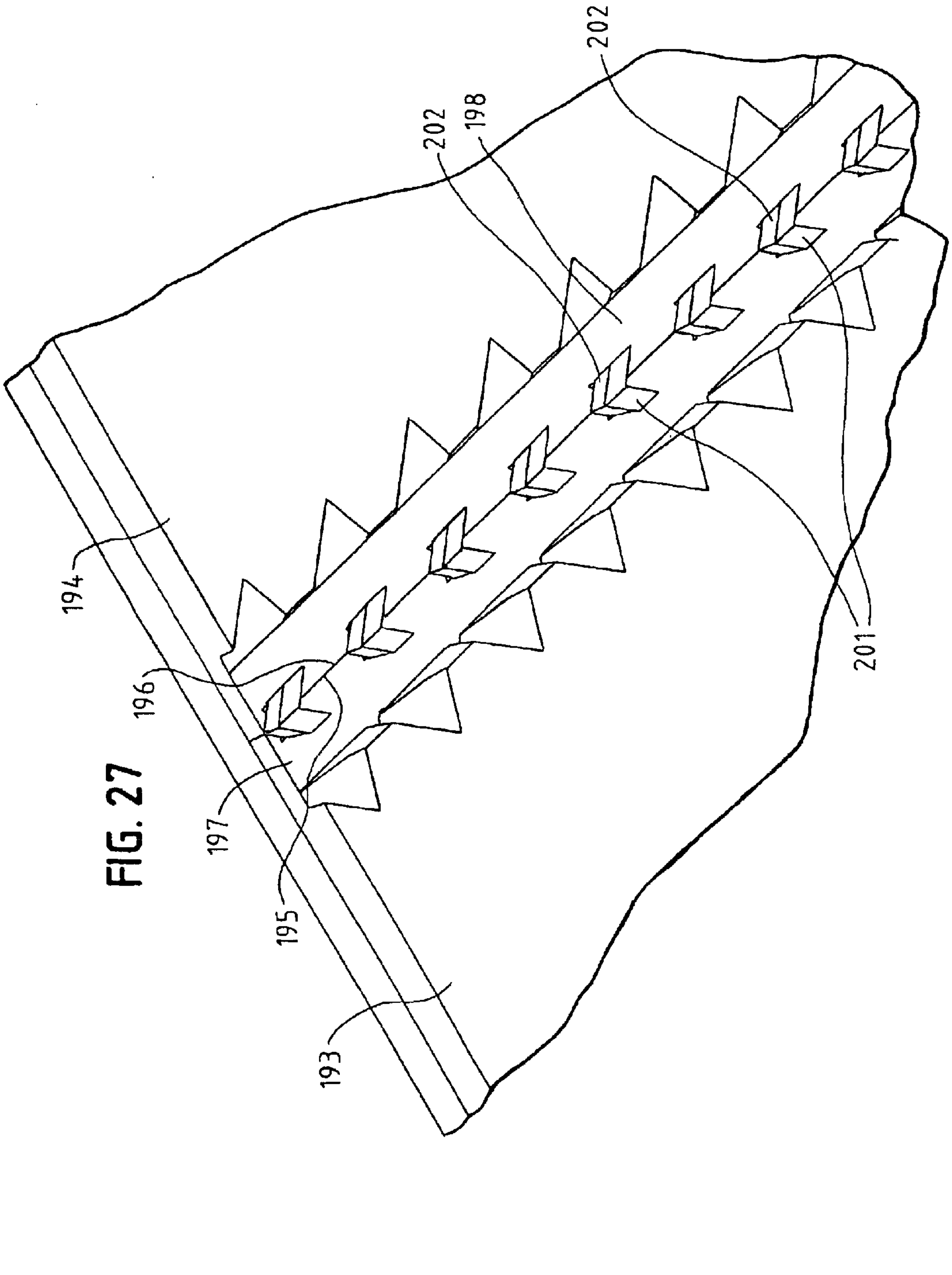
FIG. 27 is a fragmentary perspective view of the bottom surface of a short section of the embossing plates of FIG. 25 which illustrates the wedging knobs on the embossing plates which cooperate with the spring clip of FIG. 26.

First approach: Referring now to FIGS. 25–27, a U-shaped spring clamp or clip 182, similar in function to an office "black binder clip", extends the full axial length of an embossing roll 183. The spring clip is positioned in an axially extending groove 184 in the embossing roll. The spring clip 182 includes a bottom wall 186, a pair of parallel sidewalls 187 and 188, and a plurality of upwardly and inwardly extending spring fingers 189 and 190 which are separated by notches 191.

A pair of adjacent embossing plates 193 and 194 include axially extending side edges 195 and 196. The bottom surface of the plate 193 is provided with a longitudinally extending recess 197, and the bottom surface of the plate 194 is provided with a longitudinally extending recess 198. Wedging knobs 201 and 202 (FIG. 27) are provided in the recessed portions of the plates adjacent the longitudinal edges of the plates. The longitudinal spacing between the wedging knobs 201 and 202 correspond to the spacing between the spring fingers 189 and 190.

The embossing plates are installed on the embossing roll by positioning the embossing plates so that the wedging knobs 201 and 202 on adjacent plates are inserted into the notches 191 in the spring clip 182. The spring clip is then moved axially until the spring fingers 189 and 190 engage the wedging knobs 201 and 202. Each pair of wedging knobs wedges apart a pair of spring fingers 189 and 190. The material of the spring clip 182 is selected to generate the desired clamping force, for example, 100 pounds per inch along the longitudinal edges of the embossing plates.

Figure 46:
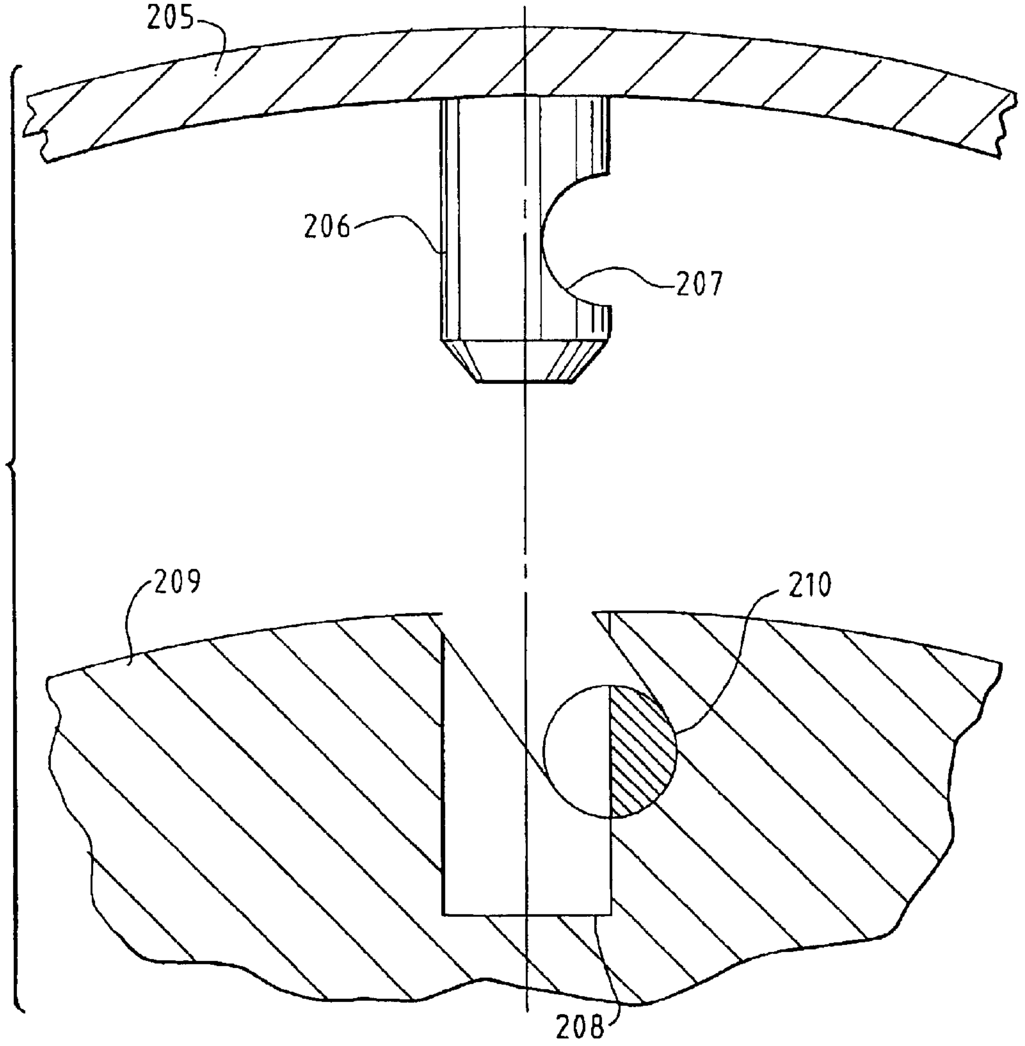
FIG. 46 is a fragmentary sectional view of one embodiment for mechanically retaining a row of engraved plates.

An independent retaining system is advantageously used to hold the plates loosely in place (even if the roll is inverted) because all plate rows must be loosened in order to remove just one plate. An example of a retaining system is illustrated in FIG. 46, which is similar to FIG. 16. Each embossing plate 205 includes one or more guide pins 206 which are provided with circular notches 207. The studs are inserted into openings 208 in the embossing roll 209 and are captured by rotatable notched rods 210 as described with respect to FIG. 14.

To assure the highest radial precision, circumferential tensioning of the engraved plates should preferably avoid any force systems that could curl up the edges of the plates. This is conveniently effected by pulling near the mid-plane MP (FIG. 25) of the plate. However, other methods are also possible. FIGS. 31–34, which will be explained hereinafter, illustrate some of the other methods.

Any suitable means for moving the spring clip 182 axially can be used. For example, the spring clip can be attached to a plunger which is reciprocated axially by a pneumatic, hydraulic or electrical actuator, attached either to the roll or to the embosser frame, which is controlled from the end of the embossing roll.

The retaining/loading mechanism desirably exerts a tangential or a tangential-plus-inward force which stresses the plate in a direction which is tangent to the cylindrical surface of the embossing roll sufficiently to load the plate securely against the roll at the peripheral speed of the rotating embossing roll. Centrifugal stress in steel is calculated as:

$1\ \text{psi} \times (\text{web speed}/184\ \text{feet per minute})_2$

Web speeds in modern rewinder lines typically reach 3,000 feet per minute or more. Centrifugal hoop stress in steel engraved plates which rotate at a web speed of 3,000 feet per minute is therefore 265 psi. A designed tangential loading stress of 500 psi is approximately double the calculated centrifugal stress and ensures that the embossing plates remain adequately preloaded against the roll body at the design speed. For an engraved plate having a thickness of 0.2 inch, a tangential stress of 500 psi requires 100 pounds tangential force to be applied per linear inch of plate edge.

Figure 29:
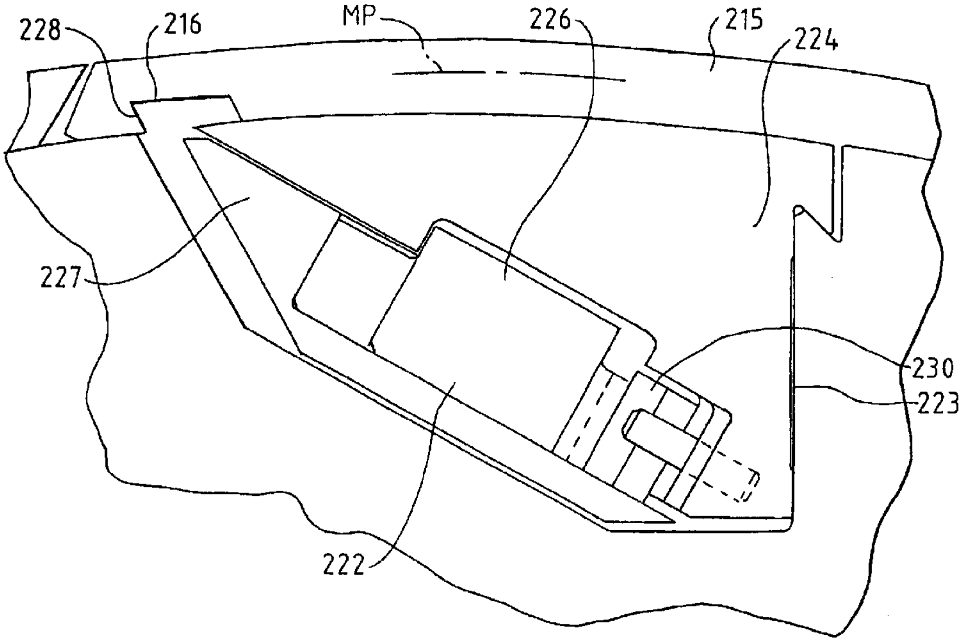
FIG. 29 is an enlarged fragmentary view of a portion of FIG. 28 illustrating the retaining/loading wedge mechanism for engaging one edge of the embossing plate, in its retracted position.
Figure 30:
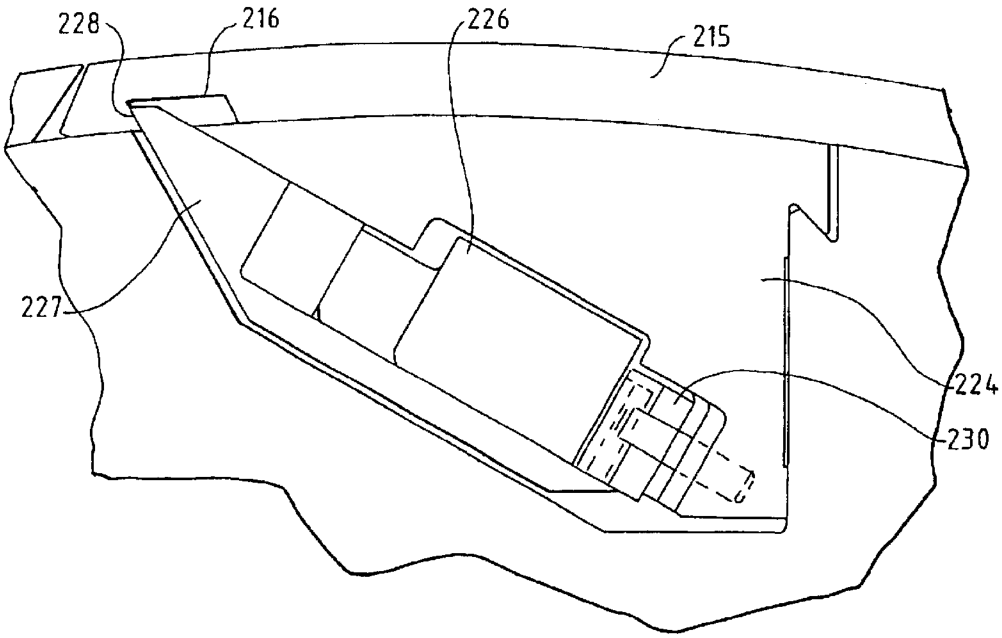
FIG. 30 is a view similar to FIG. 29 showing the retaining/loading wedge mechanism in an extended and loaded position.

A preferred embodiment of a retaining/loading mechanism, representing the second approach, is illustrated in FIGS. 28–30. Each embossing plate 215 in one axial row is provided with a longitudinally extending cavity or groove 216, 217 (similar to 170 of FIG. 21B) along each longitudinal edge. A fixed rail 219 is mounted along the full length of the embossing roll 220, and projects into the cavities 217. The other edges of the embossing plates are retained and loaded by an extendable retaining/loading mechanism 222 which is mounted in a longitudinally extending recess 223 along the full length of the embossing roll. An insert 224 is positioned in the groove 223 along the full length thereof and covers the retaining/loading device.

Referring to FIG. 29, the retaining/loading device 222 includes an actuator 226 and an extendable wedge 227 which is moved by the actuator 226. FIG. 29 illustrates the actuator 226 and the wedge 227 in their release positions. In the particular embodiment illustrated, the actuator 226 is a camming bar. However, other devices for extending and retracting the wedge 227 can be used.

The embossing plate 215 is secured on the embossing roll by first positioning the groove 217 in the embossing plate so that it is engaged by the fixed rail 219. The other groove 216 is positioned relative to the extendable wedge 227 as illustrated in FIG. 29. The cam bar 226 is then displaced axially to move the wedge 227 outwardly as illustrated in FIG. 30. The outer end of the wedge 227 enters the groove 216 and engages the side wall 228 of the groove, thus retaining the plate. The wedge 227 contacts the groove wall near the midplane MP of the embossing plate, and the advancement of the wedge tip against the wall 228 provides a force component which tensions the embossing plate tangentially and in the midplane. Localizing the tensioning force near the midplane of the plate minimizes bending-induced plate runout. This tangential tensioning force pulls the embossing plate tightly against the embossing roll. In addition, the undercut angle of the inclined wall 228 creates an additional radially inward component of force to assist in holding the edge of the plate down.

To remove the embossing plate, the cam bar 226 is reversed to retract the wedge 227. In the particular embodiment illustrated the wedge retracts beneath the surface of the roll. However, in general, below-surface retraction is not necessary for proper functioning.

A compliant spring 230 is advantageously positioned between the cam bar 226 and either the insert 224 or the wall of the embossing roll press 223. The compliant spring advantageously flexes 0.100 inch or more when the actuator 226 is further extended to load the embossing plate, so that slight dimensional imprecision in the parts does not dramatically affect the final loading force.

Various types of actuators can be used to move the wedge 227. A rotatable cam actuator will be discussed hereinafter. However, pneumatic, hydraulic, or electrical actuators can also be used to extend and retract the wedge 227 or slide the cam bar 226. A single actuator advantageously suffices for an entire longitudinal row of embossing plates, and can be moved or controlled from the end of the embossing roll.

Figure 31:
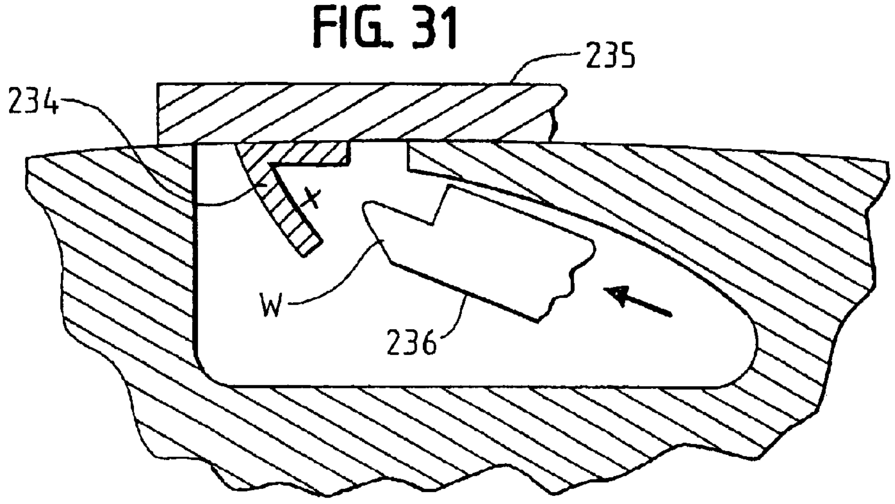
FIG. 31 is a view similar to FIG. 30 which illustrates the embossing plate edge equipped with an appendage rather than a cavity for engaging the retaining/loading wedge mechanism.

FIG. 31 illustrates welded-on or screwed-on plate appendages rather than cavities or grooves for circumferentially tensioning an embossing plate. In FIG. 31 an angle 234 is attached to the embossing plate 235. The legs of the angle form an acute angle, and the lower leg is engaged by the wedge 236 which is extended and retracted by an actuator (not shown).

Figure 32:
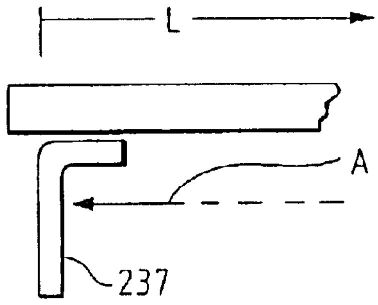
FIGS. 32–34 are fragmentary sectional views of an embossing plate edge showing the effects of appendage angle and contact-point location on plate-edge bending.
Figure 33:
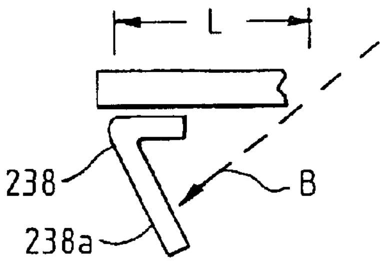
Figure 34:
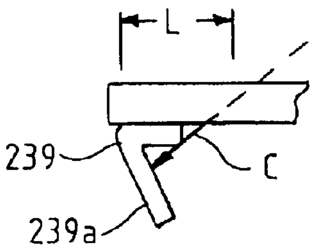

FIGS. 32–34 illustrate the effects of appendage shape and size on plate bending. In FIG. 32 an L-shaped angle 237 is engaged by a retaining/loading device which exerts loading force in the direction of arrow A. The length L of bent plate is long. Applying the force nearer (short leg) reduces the bending moment. In FIG. 33 an angle 238 having a relatively long leg 238 is engaged by a retaining/loading device which exerts loading force in the direction of angle B. The bent length L is shorter. In FIG. 34 an angle 239 having a short leg 239*a* is engaged by a device which exerts loading force in the direction of arrow C. In this case length L is shorter yet. The angle and the height of the loading point on the appendage or angle dictates both the radial component of loading and the tendency to bend the engraving plate. If an appendage is used, preferably the direction and application point of the loading force exposes only a short segment of the seated plate to bending moments, as in FIG. 34. One way to minimize plate-bending moment is to load the appendage with forces substantially equivalent to a pure force at the plate mid plane.

Figure 35:
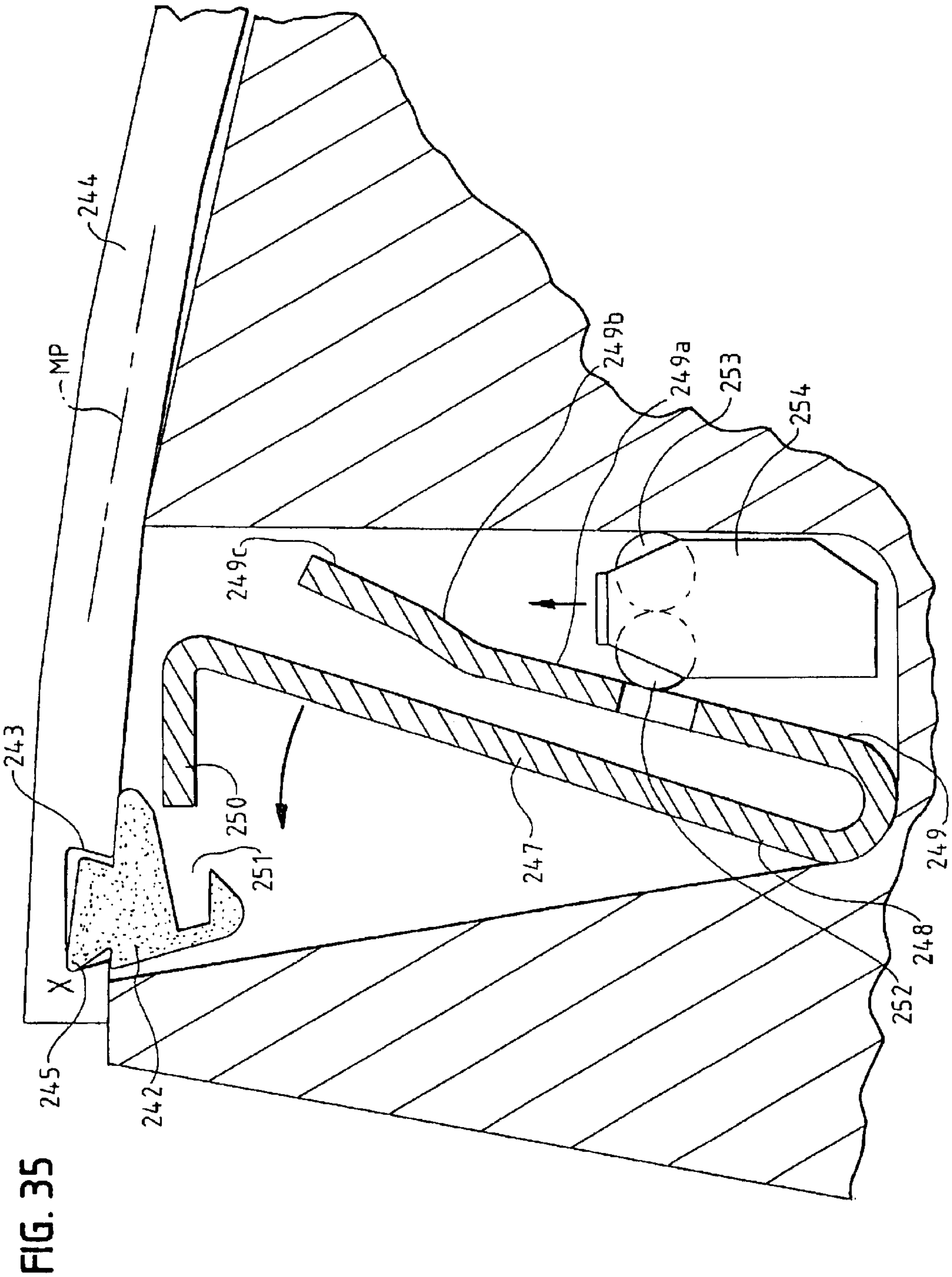
FIG. 35 is a fragmentary sectional view similar to FIG. 28 which illustrates a replaceable tensioning appendage on the embossing plate, which is engageable by a spring clip to apply mid-plane forces.
Figure 36:
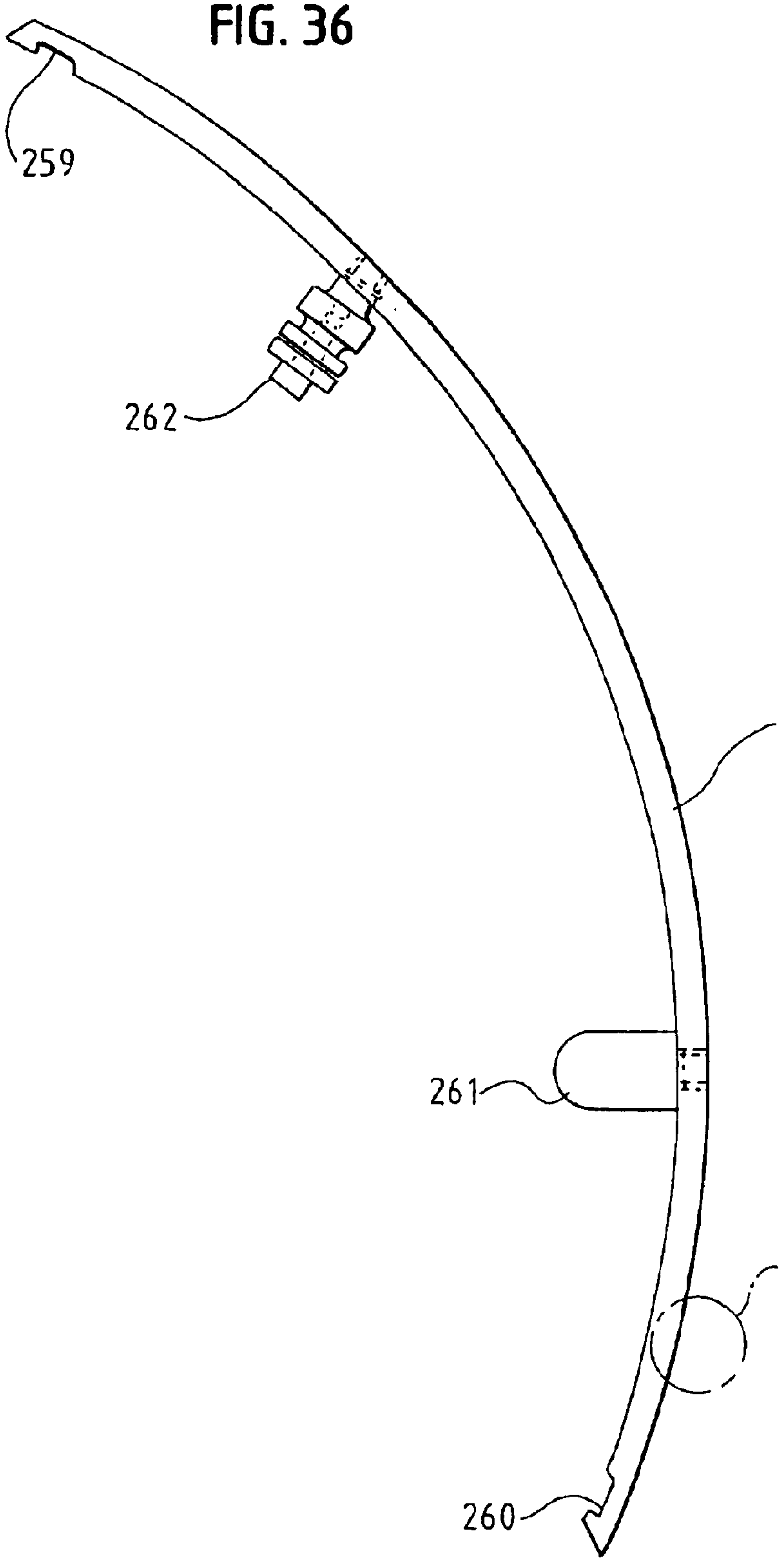
FIG. 36 is an end view of a preferred embossing plate which is provided with a detent roller pin and a guide pin.
Figure 36A:
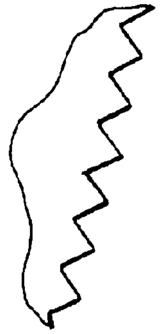
FIG. 36A is an enlarged and schematic fragmentary view of the engraved surface of the embossing plate of FIG. 36.
Figure 37:
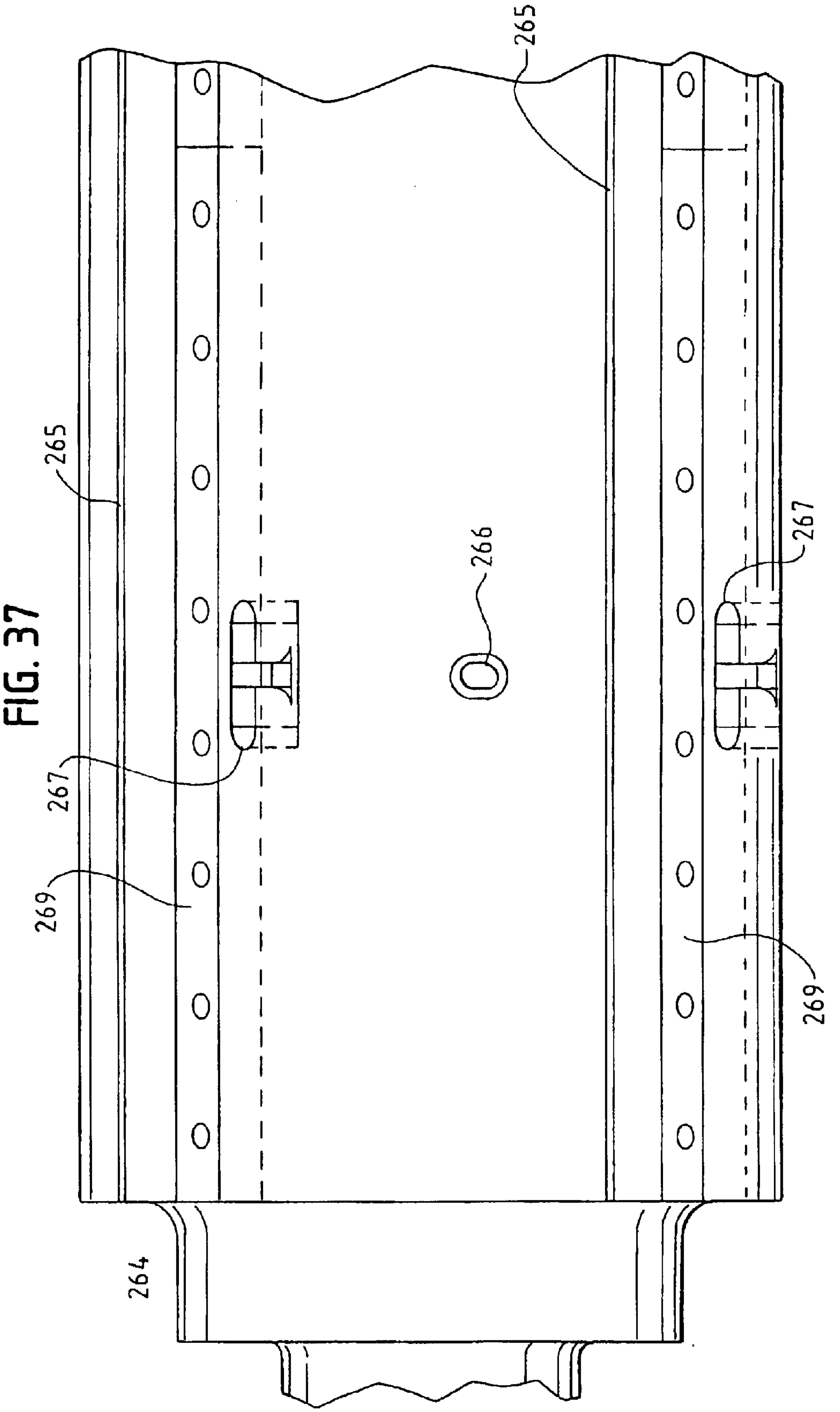
FIG. 37 is a fragmentary side view of an embossing roll which cooperates with the embossing plate of FIG. 36.

FIG. 35 illustrates a replaceable gripping appendage 242 which is trapped in a longitudinal groove 243 in the engraved plate 244. The appendage includes an edge 245 which applies a pure force on the engraved plate at the midplane MP of the plate so that the plate edge does not curl.

The appendage 242 is engaged by a generally U-shaped spring clip 247 which includes a pair of legs 248 and 249. The leg 248 terminates in an angled end portion 250 which can be inserted into a moment-transmitting slot 251 in the appendage 242. The leg 249 includes a lower portion 249*a* which extends generally parallel to the leg 248, a relatively short angled midportion 249*b* which extends away from the leg 248, and a longer angled end portion 249*c* which extends away from the leg 248. Multiple pairs of friction-reducing ball bearings 252 and 253 are retained in a ball retainer 254. Ball 252 engages the spring leg 249, and ball 253 engages the wall of the groove in the embossing roll. The embossing plate is retained by camming the ball retainer upwardly. As the ball 252 engages the angled midportion 249*b* of the leg 249, the leg is moved toward the appendage 242. As the ball 252 engages the angled end 249*c* of the leg 249, the spring urges the appendage 242 to the left and exerts a tangential tensioning force on the embossing plate. For proper working, the spring clip must bear against a support such as the left wall of the groove, whose reaction force eliminates plate bending. This is an example of a spring positioned between actuator and plate, rather than the actuator positioned between the spring and the plate.

FIGS. 36–39 illustrates the currently preferred and perhaps the most convenient embodiment, a refinement of that illustrated in FIGS. 28–30. This embodiment locks an entire longitudinal row of embossing plates at a time and includes features to help move each plate into the correct position for retaining and loading.

Each embossing plate 258 is provided with grooves 259 and 260 adjacent the axial edges of the plate. One or more guide pins 261 extend radially inwardly from the bottom surface of each plate, and one or more detent/roller pins 262 also extend generally radially inwardly from the bottom surface of the plate.

The embossing roll 264 is provided with a longitudinally extending sequence of fixed rails 265 for each of the longitudinal rows of embossing plates, and a row of guide pin pockets 266 and a row of detent pockets 267 for the guide pin and detent/roller pin of each plate.

A roll-length retaining/loading mechanism 269 extends for the length of the roll and is preferably composed of a linear sequence of shorter more easily manufactured locking modules. The mechanism is positioned in a longitudinally extending cavity 270 for each of the longitudinal rows of embossing plates. An insert 271 captures the retaining/loading device and provides firm support for the plate.

Each embossing plate is secured by first guiding it so that the cavity 260 approaches the fixed rail 265 at an angle permitting them to co-operate. Guidance of the embossing plate can be achieved by sliding the axial edge of the embossing plate which is adjacent the cavity 259 circumferentially of the roll body while the guide pin 261 slides along the bottom ramp of the pocket 266. The retaining/loading mechanism 269 remains substantially withdrawn below the surface of the roll while the embossing plate is positioned and held snugly by the detent pin 262. The retaining/loading mechanism is then extended, and finally exerts a tangential or a tangential-plus-inward force which stresses the plate tangentially and securely locks the plate. As previously described, a tangential tensile stress of 500 psi is advantageous for securing a steel embossing plate on an embossing roll which rotates at a peripheral speed of 3,000 fpm. If the average plate thickness is 0.2 inch, the required edge force is approximately 500×0.2 or 100 pounds per inch.

Plate retaining and loading is effected by a movable wedge 274 which is driven out at a shallow angle by a cam bar 275 (see also FIGS. 40 and 41) and engages the undercut groove 259 in the plate. The groove 259 has an inclined face 276 (FIG. 38A), so that the force applied by the wedge is angled somewhat inwards from a tangent line. The reaction thrust of the cam bar is provided by a compliant spring 277 (FIG. 40), which flexes 0.100 inch or more in building up force so that slight dimensional imprecision in any of the parts does not dramatically affect the clamping.

Figures 38, 38A, 38B, 38C, 39:
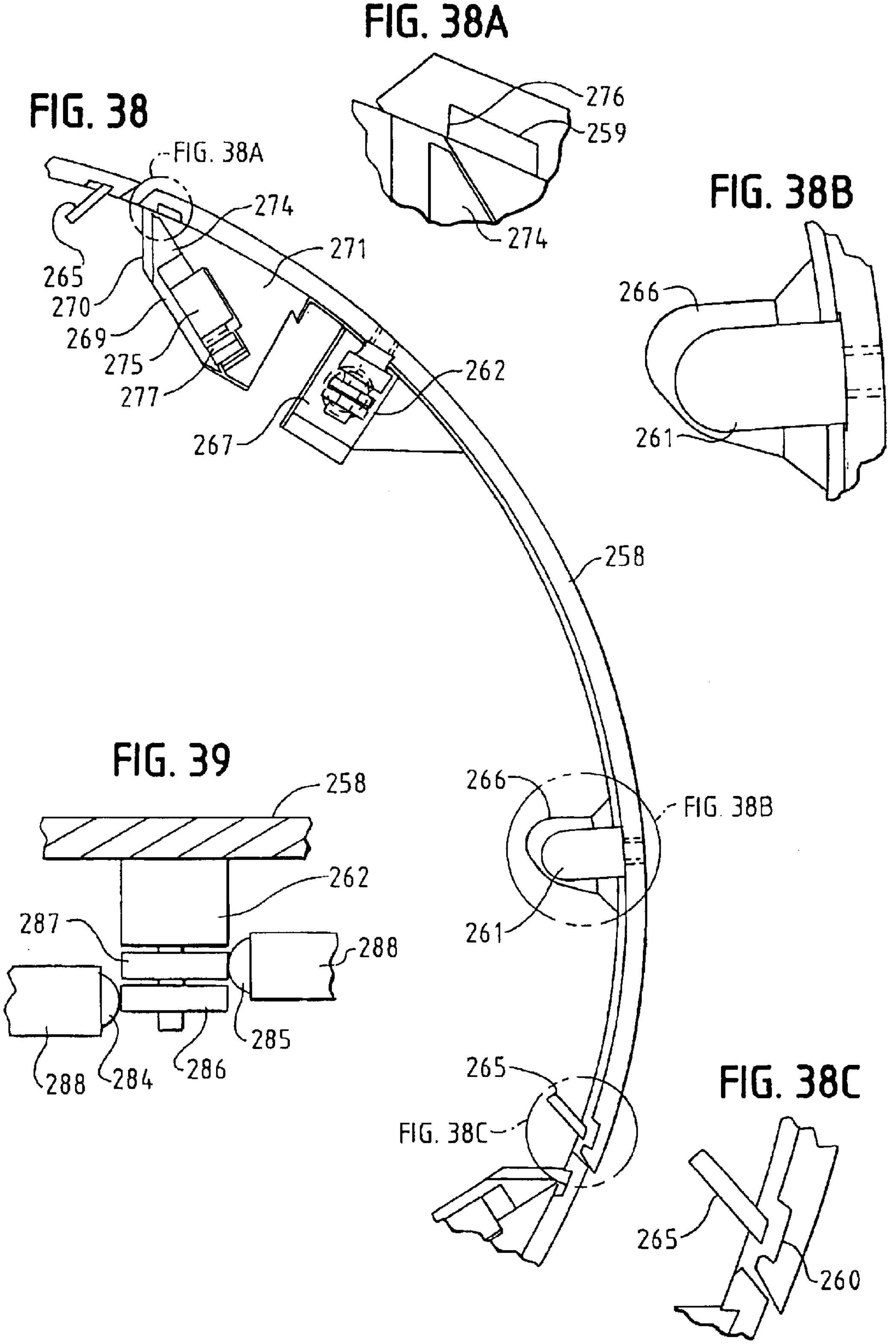
FIG. 38 is a fragmentary sectional view showing the embossing plate of FIG. 36 in the process of being slid into position on the embossing roll of FIG. 37.
FIGS. 38A–38C are enlarged views of portions of FIG. 38.
FIG. 39 is a fragmentary tangential view illustrating the detent/roller pin on the embossing plate of FIG. 38 engaged by ball plungers in the embossing roll.
Figure 40:
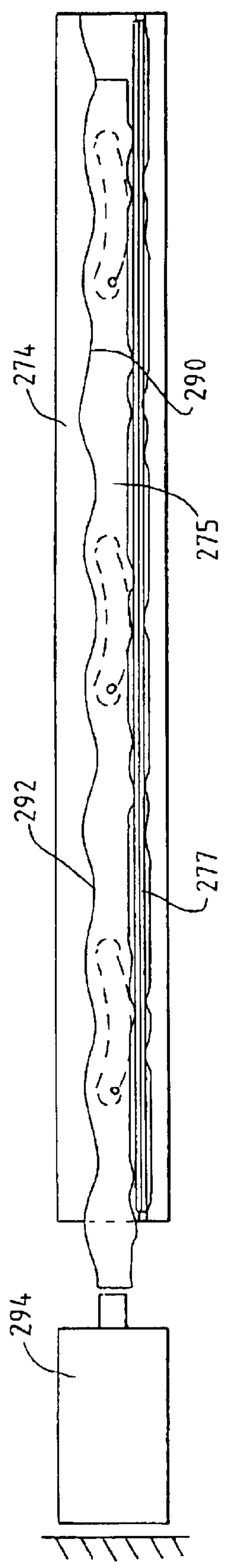
FIG. 40 illustrates the retaining/loading wedge of FIG. 38, camming surfaces to actuate it, and springs to load it compliantly.
Figure 41:
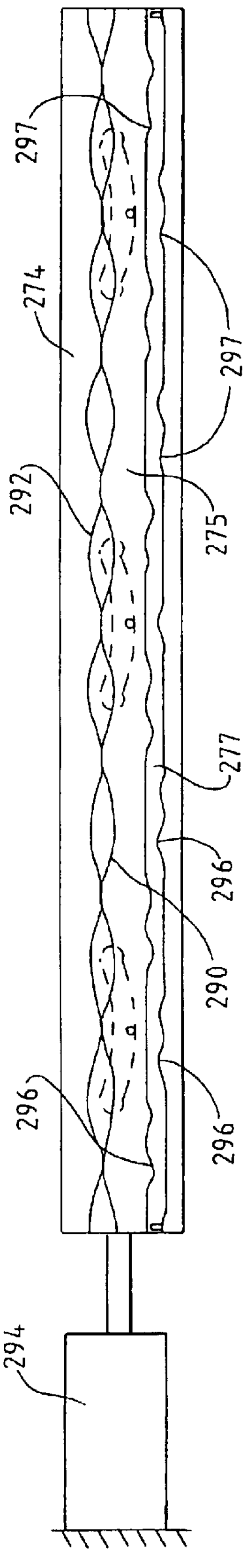
FIG. 41 illustrates the wedge of FIG. 40 forced into the extended and loaded position by an actuator.

The procedure for plate installation for this embodiment is:

1. The embossing roll is rotated to the correct orientation to exchange a given longitudinal row of plates.
2. The plate being installed is conveyed toward its intended position on the roll, substantially without axial motion. For example, the plates can be hand carried, transported by a crane 280 (FIG. 42), or transported by a wheeled cart 282 (FIG. 43).
3. As the plate approaches the roll, a guide pin 261 and detent pin 262 on the plate enter wide-mouth cavities 266 and 267 on the roll, which narrow down to guide the plate precisely onto the rail 265. The leading edge of the plate adjacent the cavity 259 makes contact with the roll surface for additional guidance. As soon as the guide pin is partially inserted, it also supports the plate from falling, as long as the plate is urged toward the roll.
4. The plate is precisely guided through simultaneous translation and rotation onto the first, fixed gripping rail 265. Mating features of the gripping rail 265 on the roll and the cavity 260 in the plate have generous tapers to prevent any jamming or interference.
5. Detent balls 284 and 285 (FIG. 39) in the detent pocket 267 of the roll engage detent rollers 286 and 287 on the detent pin 262 to pull the plate snugly to remove clearance between the plate and the roll, to retain the plate against dropping, and to provide a "feel" indication of successful placement of the plate prior to retaining and loading. Each of the balls 284 and 285 is retained in a ball plunger housing 288 and resiliently biased outwardly by a compression spring within the housing.
6. The retaining/loading device 269 includes a movable wedge 274 which is extended or retracted by an actuating device 275 (FIGS. 38 and 38A). In the embodiment illustrated in FIG. 40, the device 275 is a cam bar which has a serpentine or wave-like upper edge 290 which provides multiple camming surfaces. The wave-like upper edge of the cam bar is engageable with a correspondingly shaped wave-like lower edge 292 of the wedge 274. When the cam bar 275 is moved axially by a hydraulic cylinder 294 or other force-producing means (compare FIGS. 40 and 41), the movable wedge 274 is moved outwardly into the cavity 259 of the embossing plate. Again, there are generous tapers and clearances on the movable rail and the wall of the cavity to ensure successful engagement between the movable wedge and the embossing plate.
7. Once the movable wedge 274 is positioned to retain the embossing plate, continued axial sliding motion of the cam bar 275 forces the cam bar to submerge deeper into the embossing roll cavity and bend a slender spring bar or bars 277 into a sinuous curve (FIGS. 40 and 41). Deformation of the compliant spring builds up the plate-tensioning force to the required levels. As an example, if the spring generates 120 lbf/in with 0.100 inch compression, then allowing a total tolerance of as much as 0.020 inch would cause a tension loss of at most 20%, thereby maintaining the required plate tension despite manufacturing inaccuracy. The high frictional force provided by the compressed spring retains the cam bar securely in position during embossing, much as properly torqued screws remain in place in operating machinery. The protrusions forcing the spring bar into a sinuous shape are of two types: full-height protrusions 296 corresponding to the peaks and valleys of the deformed bar; and half-height protrusions 297 falling midway between a peak and a valley. Preferably the deformed-spring ends rest on half-height protrusions, as this will assure that the intended force-per-unit-length is developed over the entire length of the spring. The assembled retaining/loading mechanism can be shortened to fit within the roll face, without compromising its intended function, by cutting through the spring and the rest of the mechanism just beyond a half-height protrusion, while the cam bar is in the "loaded" axial position. (To complete the length reduction, a spring-retaining means must be added to prevent the spring bar from moving axially.)
8. The tensioning forces load the embossing plate tightly against the roll. In addition, the undercut angle of the wall 276 of the groove 259 creates a radially inward component of pull to assist in holding the edge down. Relief angles on the wedge ensure that it pushes only at its tip. This places the tensioning force near the mid-plane of the plate to minimize plate bending and runout.
9. To remove the plate, the cam bar 275 is moved in the reverse axial direction by the hydraulic cylinder 294. This first relaxes the spring 277, and then positively forces the movable wedge 274 to retract into the roll. Finally, a manual tangential pull force applied to the plate near the detent pin will overcome the detent grip and allow the plate to be removed. Optionally, the pulling force can be applied with a vacuum suction head, which would also serve to convey the plate to a storage location.

Notable features of this embodiment include:

1. Passively secure plate locking which retains the plate even if there is a power loss or when the roll is removed for transportation.
2. Actuator assembly is modular for simple manufacture. To populate any roll length, full length modules can be installed end-to-end, then the last one can be cut to fit.
3. If service is required, the lock assembly can be removed easily and replaced in its original location with high repeatability.

It is obvious that a wide variety of actuators, powered by force, torque, hydraulics, pneumatics, or springs, and optionally interconverting linear and rotary motion, or force and pressure, could easily engage and load the embossing plates from their underside without substantially altering the character of the invention.

Figure 44:
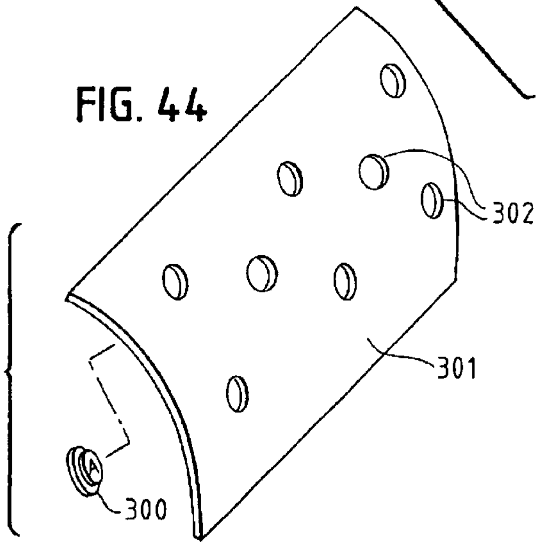
FIG. 44 is an exploded perspective view of an engraved plate with removable plugs for economically customizing an embossing pattern.
Figure 45:
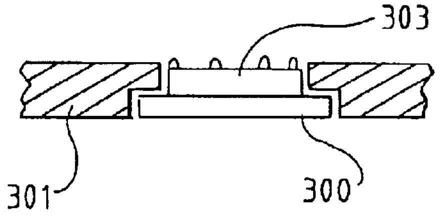
FIG. 45 is a fragmentary sectional view illustrating the plug of FIG. 44 inserted into the engraved plate.

FIGS. 44 and 45 illustrate replaceable embossed plugs 300 which can be used to customize embossing plates economically. An embossing plate 301 is provided with holes 302. While the plate is off the roll, a plug 300 can be secured in each hole, and each plug has an engraved surface 303.

Figure 42:
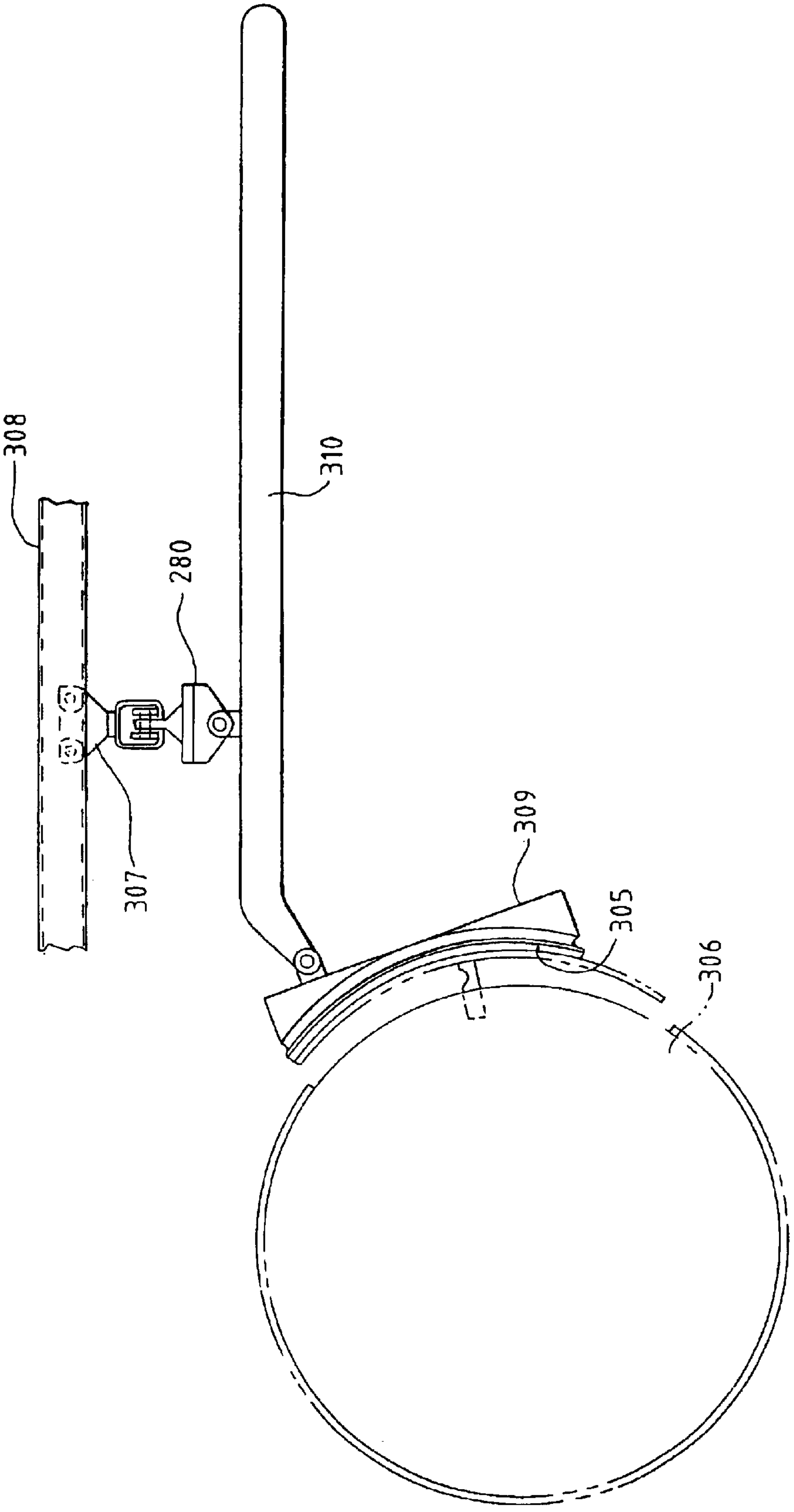
FIG. 42 illustrates a vacuum lifting head and a crane for installing embossing plates on a high roll.

Referring to FIG. 42, embossing plates 305 can be transported to an embossing roll 306 by a crane 280. The crane includes a trolley 307 which rides on an overhead rail 308 at substantially the proper height for installation. A vacuum lifting head 309 is supported and positioned by a guide handle 310.

Figure 43:
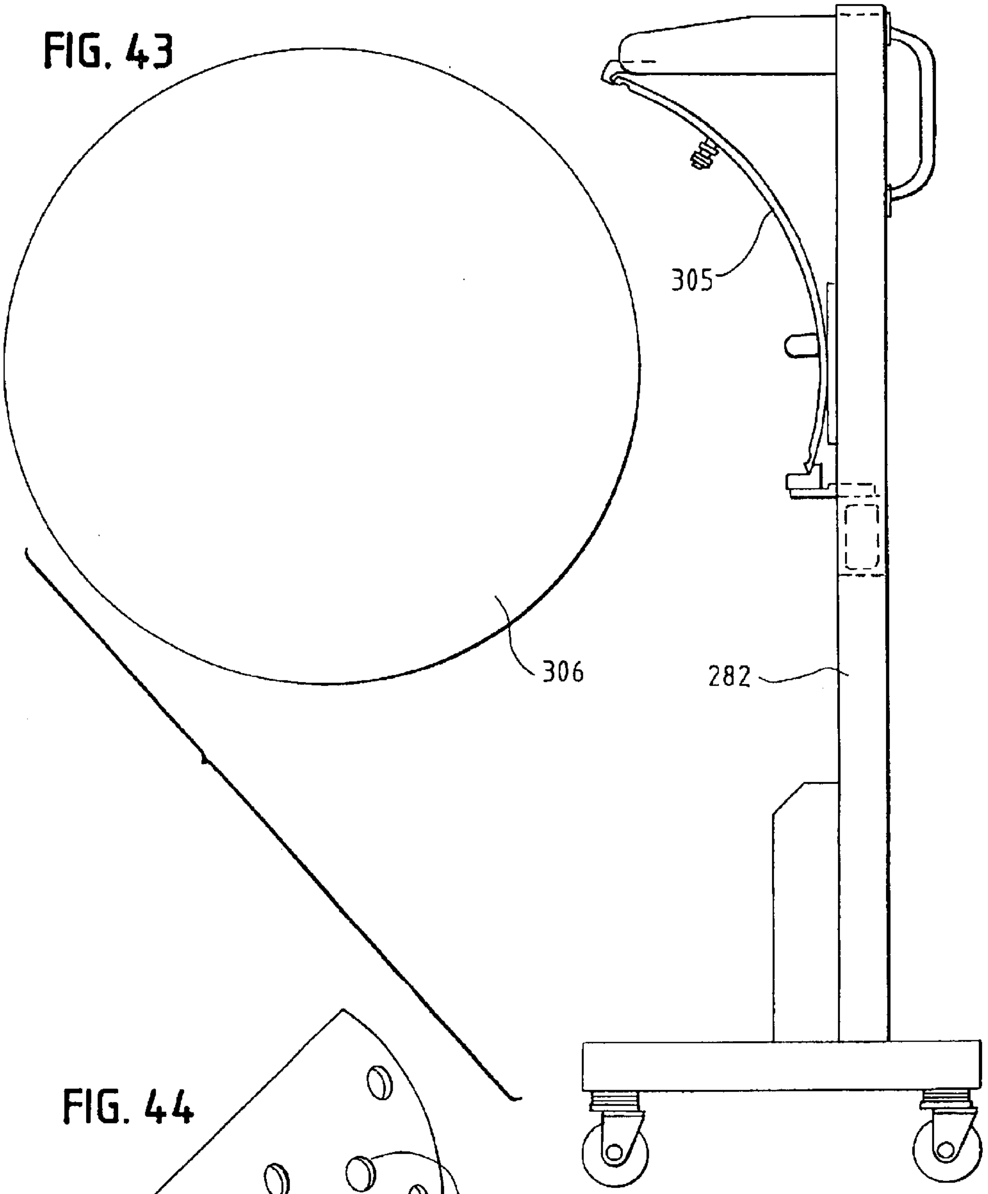
FIG. 43 illustrates a cart for installing embossing plates on a low roll.

In FIG. 43 individual embossing plates 305 are transported and installed by a wheeled cart 282, which is constructed at the proper height for easy installation.

F. Distinguishing Features of the Invention

The foregoing description makes apparent that the invention provides the following distinguishing features:

1. Uninterrupted coverage of the working surface of a long roll:

It is difficult to detachably mount plates or dies to a roll (mechanically rather than magnetically) without substantial gaps between them, or pattern-interrupting fastener heads, or areas left free, e.g., for clamp rings. On a shorter roll it may be feasible to clamp the dies solely beyond the edges of the web or tighten screws from underneath, but this is not practical on a longer roll.

The invention involves inter-plate gaps smaller than 0.030 inch (perhaps even smaller than 0.010 inch), and all fastening effected entirely from the plate underside. While some prior art die-changing has already involved underside fastening, it is not quick-change (especially on a long roll), and often requires generous access to the end of the roll.

Of the prior art adapted to quick changeover, only Leanna U.S. Pat. No. 4,116,594 discloses substantially uninterrupted surface coverage, and his plate holding is done magnetically, i.e., non-mechanically. For reasons of easy removability and precise holding, it is limited to more flexible (thinner, hence more shallowly engraved) plates than are usually needed for tissue embossing. When using our less-flexible and heavier plates, magnetic holding would have to be made controllable and also stronger, and such improvements would be expensive. Magnetic holding also requires plates to be made of steel or iron.

2. Rapid change of the plates of a long roll:

Keeping the plates light enough (and small enough) for easy handling leads to a large number of them. Instead of removing multiple screws per plate, or even loosening a multiplicity of bolted-on clamp collars, we conveniently release an entire row of plates with a simple push of a jacking mechanism, which may advantageously be controlled from a position near the end of the roll. There is no loose hardware to re-install (or even lose). And any one plate in the row can easily be removed without first shifting the others.

3. No need for plate-clearance at the roll ends:

Long rolls are supported at both ends, so a tubular sleeve cannot be installed until the roll support at one end is somehow removed (along with part of the side-frame). Even when the dies are not full 360-degree rings, they still must often be removed in an axial direction. See, e.g., Sato U.S. Pat. No. 5,173,313. (If the plates are to be exchanged without removing the roll, this requires that the frame be shaped in a away that permits the die to slide off. Secondly, it means that a middle die in a row of dies cannot be removed until all of the dies impeding it are taken off.)

The invention does not require end-clearance—plates are removed in a substantially radial direction to which there are rarely structural impediments. This makes it possible to retrofit the system to existing embossers, where end-clearance would be difficult or impossible to provide.

4. Uniform preloading of light-weight plates against the roll:

For proper radial precision (advantageous for uniform embossing and glue application), and to prevent wear or noise or pattern shift from inadequate support, plates are firmly and uniformly pre-loaded against the precision-ground roll surface. This is related to plate rigidity—when plates are extremely thick (therefore heavy), just one or a few fastening points could suffice, as taught by Bibb U.S. Pat. No. 1,357,141 and Simpson U.S. Pat. No. 1,558,206. But with the flexibility of our light-weight construction a great many pulldown points would be required. (And, thermal expansion could lead to plate buckling and lift-off).

Radial preload of somewhat flexible plates is preferably achieved by circumferentially tensioning the plates, as taught by Sato. For the disclosed plate thickness, the tension advantageously exceeds 10 lb/in. This approach relies on a slight degree of plate flexibility to work well. In the first embodiment, radial preload is effected by evacuating atmospheric air from under the plates. The seals are partially submerged into gland grooves so they do not cause runout.

The invention is particularly suitable for continuous web embossing using deeply engraved embossing plates or dies. Continuous web embossing embosses one or more moving webs as illustrated in FIGS. 3 and 4 with a rotating embossing roll.

Deeply engraved plates or dies have 0.040 inch or deeper engraving, so a plate thickness of greater than 0.075 inch, more likely greater than 0.125 inch is required. In order to permit the plates to be easily carried, the thickness is preferably less than 0.375 inch. The thickness required for deep engraving (and the cavities on the underside for the retaining mechanism) means that the plate will be almost rigid in comparison, for example, to the magnetically retained plates of Leanna U.S. Pat. No. 4,116,594.

G. Plate Fabrication

For all embodiments of this plate-mounting invention, the plates must be made precisely enough so that the available loading force can press them firmly to the roll. Any of three approaches may be used:

1. Start with a short, thick-wall tube, bore it precisely leaving the wall fairly thick, then turn down the OD to create a thin wall. Then cut it into sections. If a thin kerf is contemplated (laser cutting) the bore can precisely match the roll. If a thicker kerf is planned (saw cut), then the bore should be initially oversize, to be collapsed once the kerf material has been removed. Finally, if a precise thickness is desired, the plates can be mounted to a precise roll for OD turning.
2. A long tube is roughly bored slightly oversize, then is made precise by a gap-filling resin-injection over a precise, removable mandrel with a release coating or unbonded film. Finally the tube is cut into sections similar to the first method.
3. Individual plates are roll-formed or bump-formed to approximate shape, annealed, then machined to be precise. Modest fixturing distortions are tolerable because they will be "pulled out" by the plate-tensioning forces.

H. Summary

1. General (Functional) Description:

a) Plates fit closely together to cover the roll surface without surface interruptions. For easy handling and installation, they are segmented both around and along the roll.

b) One or more plates within a row are unloaded and released by a simple control action, permitting some or all to be removed/exchanged.

c) Plates are placed on the roll substantially without axial motion—a combination of radial displacement, tangential displacement, and rotation about an axis parallel to the roll axis.

2. Mechanical or Vacuum Retaining and Loading:

a) Plates are equipped with underside-only cavities and/or appendages. If they are to be mechanically loaded, they must be capable of being loaded substantially tangentially, so as to achieve firm pressure against the roll.

b) Optionally, a "catch" or detent acts to hold the plate in place before retaining/loading.

Various options exist for secure retaining. If they are to be vacuum loaded, seals must be supplied. When both retaining and loading are performed by mechanical means to retain with one system and load with another. But there are advantages when the same system is used for both functions. In that case two distinct approaches can be defined:

1. Actuator is used during plate changes: The retaining/loading means being permanently urged into the loading direction by spring means, an actuator is used to move it temporarily in the opposite direction (in opposition to the spring force). At that point, the plates can freely be exchanged. Subsequently, the actuator displacement is reversed, and the spring means first retains, then loads the plate.

2. Actuator is used during plate holding: Actuator urges retaining/loading means to co-operate with plate cavities/appendages. Once contact is made, further displacement by actuator serves to deform spring means until loading force is sufficient. At this point actuator is locked in position.

The specific actuating means, and plate-cavity or plate appendage shapes, and gripping-dog shape, or motion, can be varied tremendously while still performing the disclosed function. For example, you can twist a rod, advance a screw, push a rod, or inject some air or hydraulic fluid. The dogs can move in translation, rotation, screw motion, or along a complex track. Spring means can be part of the actuator, part of the dog, part of the actuator reaction, or even part of the plate.

Figure 47:
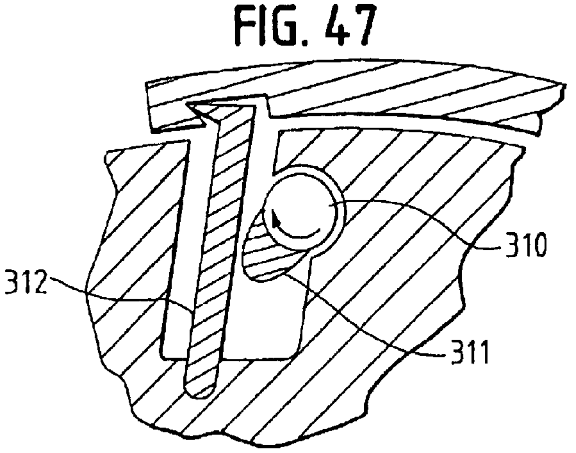
FIG. 47 is a fragmentary sectional view illustrating a rotary cam for loading a side edge of an embossing plate.
Figure 48:
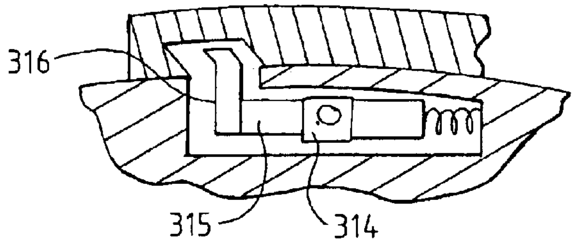
FIG. 48 is a fragmentary sectional end view showing a screw-extended toggle for loading a side edge of an embossing plate.
Figure 49:
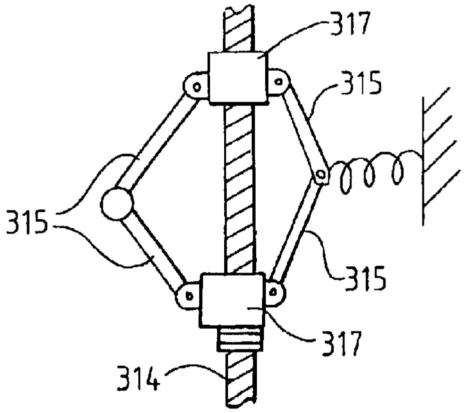
FIG. 49 is a plan view of the toggle of FIG. 48.

As one example, one can rotate a shaft to engage plate appendages and wedge against them. (Spring compliance can be provided either by shaft bending or by bending of the plate appendage.) Or, one can rotate a shaft to screw toggle-bars or wedge-nuts together, pressing on a compliant support. In FIG. 47 a shaft 310 is rotated to force cam 311 against plate appendage 312. In FIGS. 48 and 49 a screw 314 is rotated to extend toggle bars 315 to move a retainer 316 into a groove in an embossing plate. The toggle bars are attached to nuts 317 which are moved toward or away from each other by the screw 314. A hydraulic-based concept was already disclosed in FIG. 2.

I have described various mechanical means for retaining the embossing plates on the embossing roll. Such retaining means provide a mechanical interlock between a retaining mechanism and plate features (cavities, ridges, grooves, appendages) which mechanically prevents the plate from being removed, and is sufficiently strong to hold the plate close to the roll while withstanding centrifugal force in the running condition. For example, with relation to a variety of figures, mechanical retaining could involve inserting a dog into a plate groove, and locking it in place, without exerting any plate-tensioning or drawdown force. The plate grooves do not actually need any undercut to retain the plate, and a purely radial pin or radially extendable rail at each edge will retain the plate (since the two rails at opposite plate edges are not parallel but diverge 90 degrees in angle). However, pure radial extension of a rail cannot load a radial groove wall to place the plate in tension. This would be a good candidate for mechanical retaining and vacuum loading. The result of retaining is a definitely captured but otherwise loose plate.

I have also described loading means for urging the plate firmly against the roll surface (by vacuum, by tension (advantageously generated by urging the retaining means, if they include a tangential component of motion), or by the elasticity of an intentionally misfit plate when certain load points are drawn down into conformity). Magnetism can load (ferrous-only) plates against the roll, but deeply engraved thick plates require strong magnets and are too rigid to be "peeled," thus requiring expensive additional hardware to permit convenient exchange.

When actuation of the retaining or loading means proceeds by a push or rotation at the end of the roll, it will be obvious to those skilled in the art that roll-indexing means will ease the task of aligning any actuator (such as a hydraulic cylinder) with a retaining/loading mechanism to be actuated. It will also be obvious to those skilled in the art that locking hardware will be more reliable if mechanically locked in position by a pin other or cooperating indexing means. The exposed ends of the retaining/loading mechanisms would advantageously be covered over during embossing to prevent the ingress of dust and dirt. Finally, it will be obvious that operational interlocks such as electric eyes or micro switches may be desirable to prevent operators from mistakenly operating the embosser when the plates are improperly seated or not retained.

While in the foregoing specification a detailed description of specific embodiments were set forth for the purpose of illustration, it will be understood that many of the details herein given may be varied considerably by those skilled in the art without departing from the spirit and scope of the invention.

I claim:

1. An embossing roll for embossing a web comprising:

an elongated roll body having a central longitudinal axis, a cylindrical outer surface, and a pair of ends, a plurality of plates removably mounted on the roll body, each of the plates having an outer surface which is provided with an embossing pattern and an inner surface which faces the outer surface of the roll body, the plates being arranged in a plurality of rows, each row having a plurality of plates, means for mechanically retaining each of the plates on the roll body when the plates are moved toward the roll body in a direction which is perpendicular to said longitudinal axis, and means for actuating the retaining means to retain or release the plates.

2. The embossing roll of claim 1 including means for mechanically retaining each row of plates and means for actuating each of the retaining means to retain or release an entire row of plates.

3. The embossing roll of claim 1 in which said actuating means is operable from an end of the roll body.

4. The embossing roll of claim 1 in which said retaining means engages the inner surface of each of the plates and does not interrupt the outer surfaces of the plates.

5. The embossing roll of claim 4 in which each of the plates is provided with a cavity in the inner surface thereof for cooperating with the retaining means.

6. The embossing roll of claim 5 in which the retaining means includes a fixed abutment on the roll body which is positioned in the cavities of the plates.

7. The embossing roll of claim 4 in which a retaining means for each row includes a movable wedge on the roll body which is movable between a first position in which the wedge is positioned in the cavities of the plates of the row and a second position in which the wedge is withdrawn from the cavities of the plates of the row.

8. The embossing roll of claim 1 in which each of the plates includes an appendage extending inwardly from the inner surface of the plate, each of the appendages being engageable with one of the retaining means.

9. The embossing roll of claim 1 including means for uniformly and firmly forcing the inner surfaces of the plates of each row against the outer surface of the roll body.

10. The embossing roll of claim 9 in which said forcing means includes means for applying vacuum to the inner surface of each of the plates.

11. The embossing roll of claim 9 in which each of said plates includes a pair of edges which extend parallel to the axis of the roll body and said forcing means comprises means for applying a force to each of the plates adjacent at least one of said edges thereof, the force having a component which is generally tangent to the outer surface of the roll body.

12. An embossing roll for embossing a web comprising:

an elongated roll body having a central longitudinal axis, a cylindrical outer surface, and a pair of ends, a plurality of plates removably mounted on the roll body, each of the plates having an outer surface which is provided with an embossing pattern and an inner surface which faces the outer surface of the roll body, the plates being arranged in a plurality of rows, each row having a plurality of plates, means for mechanically retaining the plates on the roll body entirely from the inner surfaces of the plates so that the retaining means does not interrupt the embossing pattern on the outer surfaces of the plates, and means for uniformly and firmly forcing the inner surfaces of the plates of each row against the outer surface of the roll body.

13. The embossing roll of claim 12 in which said forcing means includes means for applying vacuum to the inner surfaces of the plates.

14. The embossing roll of claim 12 in which each of said plates includes a pair of edges which extend parallel to the axis of the roll body and said forcing means comprises means for applying a force to each of the plates adjacent at least one of said edges thereof, the force having a component which is generally tangent to the outer surface of the roll body.

15. The embossing roll of claim 12 including means for actuating the retaining means to retain or release the plates.

16. The embossing roll of claim 12 in which said retaining means retains the plates when the plates are moved toward the roll body in a direction which is perpendicular to said longitudinal axis.

17. An embossing roll for embossing a web comprising:

an elongated roll body having a central longitudinal axis, a cylindrical outer surface, and a pair of ends, a plurality of plates removably mounted on the roll body, each of the plates having an outer surface which is provided with an embossing pattern and an inner surface which faces the outer surface of the roll body, the plates being arranged in a plurality of rows, each row having a plurality of plates, means for mechanically retaining each of the plates on the roll body entirely from the inner surfaces of the plates so that the retaining means does not interrupt the embossing pattern on the outer surfaces of the plates, and means for actuating the retaining means to retain or release the plates.

18. The embossing roll of claim 17 including means for mechanically retaining each row of plates and means for actuating each of the retaining means to retain or release an entire row of plates.

19. An embossing roll for embossing a web comprising:

an elongated roll body having a central longitudinal axis, a cylindrical outer surface, and a pair of ends, a plurality of plates removably mounted on the roll body, each of the plates having an outer surface which is provided with an embossing pattern and an inner surface which faces the outer surface of the roll body, the plates being arranged in a plurality of rows, each row having a plurality of plates, means for uniformly and firmly forcing the inner surfaces of the plates against the outer surface of the roll body, means for mechanically retaining each of the plates on the roll body, and means for actuating the retaining means to retain or release the plates.

20. The embossing roll of claim 19 in which said forcing means includes means f or applying for vacuum to the inner surfaces of the plates.

21. The embossing roll of claim 19 in which each of said plates includes a pair of edges which extend parallel to the axis of the roll body and said forcing means comprises means for applying a force to each of the plates adjacent at least one of said edges thereof, the force having a component which is generally tangent to the outer surface of the roll body.

22. The embossing roll of claim 19 in which said retaining means retains the plates when the plates are moved toward the roll body in a direction which is perpendicular to said longitudinal axis.

23. An embossing roll for embossing a web comprising:

an elongated roll body having a central longitudinal axis, a cylindrical outer surface, and a pair of ends, a plurality of plates removably mounted on the roll body, each of the plates having an outer surface which is provided with an embossing pattern and an inner surface which faces the outer surface of the roll body, the plates being arranged in a plurality of rows, each row having a plurality of plates, means for applying vacuum to the inner surface of each plate for uniformly and firmly forcing the inner surfaces of the plates of each row against the outer surface of the roll body, and means for mechanically retaining each of the plates on the roll body, and means for actuating the retaining means to retain or release the plates.

24. The embossing roll of claim 23 in which said retaining means retains the plates on the roll body entirely from the inner surfaces of the plates so that the retaining means does not interrupt the embossing pattern on the outer surface of the plates.

25. The embossing roll of claim 23 including means for mechanically retaining each row of plates and means for actuating each of the retaining means to retain or release an entire row of plates.

26. The embossing roll of claim 1 in which said rows of plates extend between the ends of the roll.

27. The embossing roll of claim 1 in which said rows of plates extend axially along the roll.

28. The embossing roll of claim 12 in which said rows of plates extend between the ends of the roll.

29. The embossing roll of claim 12 in which said rows of plates extend axially along the roll.

30. The embossing roll of claim 17 in which said rows of plates extend between the ends of the roll.

31. The embossing roll of claim 17 in which said rows of plates extend axially along the roll.

32. The embossing roll of claim 19 in which said rows of plates extend between the ends of the roll.

33. The embossing roll of claim 19 in which said rows of plates extend axially along the roll.

34. The embossing roll of claim 23 in which said rows of plates extend between the ends of the roll.

35. The embossing roll of claim 23 in which said rows of plates extend axially along the roll.

* * * * *

UNITED STATES PATENT AND TRADEMARK OFFICE

CERTIFICATE OF CORRECTION

PATENT NO. : 6,716,017 B2 
DATED : April 6, 2004
INVENTOR(S) : Jeremy James Michael Papadopoulos It is certified that error appears in the above-identified patent and that said Letters Patent is hereby corrected as shown below:

Title page,
Item [75], Inventor, the name of the inventor is changed to -- Jeremy James Michael Papadopoulos --

Signed and Sealed this

Twenty-sixth Day of October, 2004

JON W. DUDAS
*Director of the United States Patent and Trademark Office*